(12) United States Patent
Hirakawa et al.

(10) Patent No.: US 9,776,680 B2
(45) Date of Patent: Oct. 3, 2017

(54) VEHICLE

(71) Applicant: YAMAHA HATSUDOKI KABUSHIKI KAISHA, Iwata-shi, Shizuoka (JP)

(72) Inventors: Nobuhiko Hirakawa, Shizuoka (JP); Kazuhisa Takano, Shizuoka (JP); Hiroshi Suzuki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/324,322

(22) PCT Filed: Sep. 28, 2015

(86) PCT No.: PCT/JP2015/077378
§ 371 (c)(1),
(2) Date: Jan. 6, 2017

(87) PCT Pub. No.: WO2016/052431
PCT Pub. Date: Apr. 7, 2016

(65) Prior Publication Data
US 2017/0203807 A1    Jul. 20, 2017

(30) Foreign Application Priority Data

Sep. 29, 2014  (JP) ................................. 2014-199002

(51) Int. Cl.
*B62K 5/10* (2013.01)
*B62K 5/05* (2013.01)
(Continued)

(52) U.S. Cl.
CPC ............... *B62K 5/10* (2013.01); *B62K 5/027* (2013.01); *B62K 5/05* (2013.01); *B62K 5/06* (2013.01);
(Continued)

(58) Field of Classification Search
CPC ......................... B62K 2005/001; B62K 11/04
See application file for complete search history.

(56) References Cited

U.S. PATENT DOCUMENTS

| | | | | |
|---|---|---|---|---|
| 4,787,470 | A | * | 11/1988 | Badsey ................ B62D 61/065 180/210 |
| 2006/0065456 | A1 | * | 3/2006 | Noda ..................... B62K 11/04 180/219 |

(Continued)

FOREIGN PATENT DOCUMENTS

| | | |
|---|---|---|
| JP | 2008-168893 A | 7/2008 |
| JP | 2011-57018 A | 3/2011 |

(Continued)

OTHER PUBLICATIONS

Official Communication issued in International Patent Application No. PCT/JP2015/077378, dated Dec. 22, 2015.

(Continued)

*Primary Examiner* — Nicole T Verley
(74) *Attorney, Agent, or Firm* — Keating and Bennett, LLP

(57) ABSTRACT

A body frame includes a link support that supports a linkage, a lower frame that connects a power unit provided in a position where at least a portion of the power unit overlaps a line when a vehicle in the upright state is seen from a side thereof and the link support together, and an upper frame that is connected to the link support above a connecting portion of the lower frame with the link support. When the vehicle in the upright state is seen from the side thereof, a point of intersection of a straight line which passes a connecting portion and intersects a middle lower axis at right angles and an upper edge of the upper frame is positioned above a point of intersection of the middle lower axis and a left steering axis in relation to the direction of the left steering axis.

11 Claims, 9 Drawing Sheets

(51) Int. Cl.
*B62K 5/06* (2006.01)
*B62K 5/027* (2013.01)
*B62K 5/08* (2006.01)
*B62K 11/02* (2006.01)
*B62K 11/04* (2006.01)
*B62K 21/12* (2006.01)
*B62K 25/08* (2006.01)
*B62K 5/00* (2013.01)

(52) U.S. Cl.
CPC ............... *B62K 5/08* (2013.01); *B62K 11/02* (2013.01); *B62K 11/04* (2013.01); *B62K 21/12* (2013.01); *B62K 25/08* (2013.01); *B62K 2005/001* (2013.01)

(56) References Cited

U.S. PATENT DOCUMENTS

| | | | |
|---|---|---|---|
| 2007/0074920 A1* | 4/2007 | Hayashi | B62K 11/10 180/228 |
| 2008/0115994 A1 | 5/2008 | Martini et al. | |
| 2011/0060494 A1 | 3/2011 | Tsujii et al. | |
| 2013/0168944 A1 | 7/2013 | Bartolozzi et al. | |
| 2015/0246704 A1 | 9/2015 | Takano et al. | |
| 2015/0298736 A1 | 10/2015 | Sasaki et al. | |
| 2016/0114850 A1* | 4/2016 | Takano | B62K 11/04 180/210 |
| 2017/0088232 A1* | 3/2017 | Kaneta | B62K 25/08 |

FOREIGN PATENT DOCUMENTS

| | | |
|---|---|---|
| JP | 5595624 B1 | 9/2014 |
| TW | 200833549 A | 8/2008 |
| TW | 201429786 A | 8/2014 |
| WO | 2014/098228 A1 | 6/2014 |

OTHER PUBLICATIONS

Official Communication issued in Corresponding Taiwanese Patent Application No. 104132300, dated Aug. 10, 2016.
Yamaha, "Parts Catalogue", MW125, Jul. 31, 2014, 67 pages.

* cited by examiner

VEHICLE

BACKGROUND OF THE INVENTION

1. Field of the invention

The present invention relates to a vehicle including a body frame that leans and two wheels that are aligned side by side in a left-to-right direction.

2. Description of the Related Art

In recent years, the usefulness of small vehicles has begun to be recognized in urban areas of countries where traffic jams are getting more severe. Small vehicles now tend to be supported widely for economic and environmental reasons. As an example of a small vehicle, there is known a three-wheeled motor vehicle like the one described in International Patent Publication No. 2014/098228 which includes two front wheels.

In general, the vehicle including the body frame that leans and the two wheels that are aligned side by side in the left-to-right direction is a vehicle that is able to turn with the body frame leaning from a vertical direction. More specifically, the body frame leans to the right of the vehicle when the vehicle turns right, whereas when the vehicle turns left, the body frame leans to the left of the vehicle. In the vehicle including the body frame that leans and the two wheels that are aligned side by side in the left-to-right direction, a distance defined between the two wheels that are aligned side by side in the left-to-right direction of the body frame is narrower than that of a general four-wheeled vehicle so as to ensure that the body frame leans as required. The vehicle including the two wheels that are aligned side by side in the left-to-right direction and the body frame that leans is a vehicle that is compact in size in the left-to-right direction.

As this type of vehicle, a vehicle described in PARTS CATALOGUE MW125 (2CM1), YAMAHA MOTOR CO. LTD. is now on market. The vehicle described in PARTS CATALOGUE MW125 (2CM1), YAMAHA MOTOR CO. LTD. includes a power unit including an internal combustion engine which produces a driving force by which the vehicle is driven. The engine mounted on the vehicle described in PARTS CATALOGUE MW125 (2CM1), YAMAHA MOTOR CO. LTD. is a relatively small engine having a displacement of 125 cc. A power unit having such a small engine is advantageous in that it is light in weight and has a superior fuel economy.

However, when wanting to travel a long distance comfortably, it is sometimes found that a vehicle with an engine of a large displacement is advantageous. The inventor of the present invention studied the possibility of a large power unit being mounted on the vehicle described in PARTS CATALOGUE MW125 (2CM1), YAMAHA MOTOR CO. LTD. that includes the body frame that leans and the two front wheels. The inventor thought that the acceleration performance increases as the displacement of a power unit increases, increasing the comfortability when traveling a long distance. Then, a load acting on a link support of the vehicle increases as the acceleration performance increases. In the event that the load acting on the link support increases, the rigidity required of the link support increases. However, when attempting to enhance the rigidity of the link support, it is assumed that the body frame increases in size.

SUMMARY OF THE INVENTION

Preferred embodiments of the present invention provide a vehicle including a body frame which is prevented from being enlarged in size while ensuring that a linkage has sufficient supporting rigidity.

According to a preferred embodiment of the present invention, a vehicle includes a body frame that leans to the right of the vehicle when the vehicle turns right and to the left of the vehicle when the vehicle turns left; a right front wheel and a left front wheel aligned side by side in a left-to-right direction of the body frame; a rear wheel disposed behind the right front wheel and the left front wheel and that is able to swing about a rear wheel swing shaft on the body frame; a power unit that drives the rear wheel; a right shock absorber that supports the right front wheel at a lower portion thereof and that attenuates an upward displacement of the right front wheel in an up-to-down direction of the body frame; a left shock absorber that supports the left front wheel at a lower portion thereof and that attenuates an upward displacement of the left front wheel in the up-to-down direction of the body frame; and a linkage including a right side member that supports an upper portion of the right shock absorber so as to allow the upper portion to turn about a right steering axis that extends in the up-to-down direction of the body frame; a left side member that supports an upper portion of the left shock absorber so as to allow the upper portion to turn about a left steering axis that is parallel to the right steering axis; an upper cross member that supports an upper portion of the right side member at a right end portion thereof so as to allow the upper portion to turn about a right upper axis that extends in a front-to-rear direction of the body frame, and that supports an upper portion of the left side member at a left end portion thereof so as to allow the upper portion to turn about a left upper axis that is parallel to the right upper axis, the middle portion of the upper cross member being supported on the body frame so as to turn about a middle upper axis that is parallel to the right upper axis and the left upper axis; and a lower cross member that supports a lower portion of the right side member at a right end portion thereof so as to allow the lower portion to turn about a right lower axis that is parallel to the right upper axis, and that supports a lower portion of the left side member at a left end portion thereof so as to allow the lower portion to turn about a left lower axis that is parallel to the left upper axis, the middle portion of the lower cross member being supported on the body frame so as to turn about a middle lower axis that is parallel to the middle upper axis; wherein the body frame connects at least the linkage and the rear wheel swing shaft together, the body frame includes a link support that supports the middle portion of the upper cross member and the middle portion of the lower cross member so as to allow the middle portions to turn above the right front wheel and the left front wheel; a lower frame that connects the power unit that is provided in a position where at least a portion of the power unit overlaps a line that connects a point of intersection of the middle lower axis and the left steering axis and the rear wheel swing shaft and the link support when the vehicle in an upright state is seen from a side thereof; and an upper frame that is connected to the link support above a connecting portion of the lower frame with the link support in relation to the direction of the left steering axis and that extends rearwards to at least a connecting portion of the lower frame with the power unit in relation to the direction of the middle lower axis, and when the vehicle in the upright state is seen from the side thereof, a point of intersection of a straight line that passes the connecting portion of the lower frame with the power unit and that intersects the middle lower axis at right angles and an upper edge of the upper frame is positioned above a point of intersection of the middle lower axis and the left steering axis in relation to the direction of the left steering axis.

The inventor of the preferred embodiments of the present invention studied the load acting on the link support.

The body frame includes the link support that supports the linkage. The link support is a member which extends in the up-to-down direction. The middle portion of the upper cross member in the left-to-right direction is supported on the link support. The middle portion of the lower cross member in the left-to-right direction is supported on the link support below the upper cross member. The middle portion of the lower cross member in the left-to-right direction is supported on the link support above upper ends of the left and right front wheels.

In the vehicle including the body frame that leans and the two front wheels, various situations are thought of where a large load acts on the link support.

For example, a situation is thought of where a braking force of a certain magnitude is applied equally to both of the right front wheel and the left front wheel. When the braking force is applied to the right front wheel and the left front wheel, a rearward load acts on the right front wheel and the left front wheel.

The force that has acted on the right front wheel is transmitted to the right side member of the linkage via the right shock absorber. Further, the force that has acted on the right side member is transmitted to a right portion of the upper cross member and a right portion of the lower cross member that are connected to the right side member. Further, the force that has acted on the right portion of the upper cross member is transmitted to the link support that supports the upper cross member. In addition, the force that has acted on the right portion of the lower cross member is transmitted to the link support that supports the lower cross member.

Similarly, the force that has acted on the left front wheel is transmitted to the left side member of the linkage via the left shock absorber. Further, the force that has acted on the left side member is transmitted to a left portion of the upper cross member and a left portion of the lower cross member that are connected to the left side member. Further, the force that has acted on the left portion of the upper cross member is transmitted to the link support that supports the upper cross member. In addition, the force that has acted on the left portion of the lower cross member is transmitted to the link support that supports the lower cross member.

As a different example, a situation is thought of where the right front wheel runs on a flat road surface, while the left front wheel is riding over a bump. When the right front wheel runs on the flat road surface, while the left front wheel is riding over the bump, a rearward pushing force acts only on the left front wheel as a result of the left front wheel riding over the bump. Then, the force that has acted on the left front wheel is transmitted to the left side member of the linkage via the left shock absorber. Further, the force that has acted on the left side member is transmitted to the left portions of the upper cross member and the lower cross member that are connected to the left side member. Further, the force that has acted on the left portion of the upper cross member is transmitted to the link support that supports the upper cross member. In addition, the force that has acted on the left portion of the lower cross member is transmitted to the link support that supports the lower cross member.

The body frame that includes the link support preferably has sufficient rigidity to bear these forces.

As a result of having considered the various situations where the loads act on the link support, the inventor discovered that most of the loads that act on the link support is transmitted from the left portion and/or the right portion of the upper cross member and the left portion and/or the right portion of the lower cross member.

Then, to ensure the rigidity of the link support while preventing the enlargement in size of the vehicle, the magnitudes of the force that is transmitted from the upper cross member to the link support and the force that is transmitted from the lower cross member to the link support have been analyzed.

As a result, having discovered the tendency that the force that is transmitted from the lower cross member to the link support is greater than the force that is transmitted from the upper cross portion to the link support and the tendency that as to components of the force transmitted to the link support, a component transmitted from the front-to-rear direction is greater than components transmitted from the up-to-down and left-to-right directions, the inventor conceived of and developed the preferred embodiments of the present invention.

As has been described above, as to the loads acting on the link supports, the inventor discovered that the load transmitted from the lower cross member tends to be greater than the load transmitted from the upper cross member. Because of this, of the upper frame and the lower frame that support the link support, the inventor studied the rigidity of the lower frame.

In the vehicles according to preferred embodiments of the present invention, when a vehicle in an upright state is seen from the side thereof, the lower frame connects the power unit which is provided in the position where at least a portion of the power unit overlaps the line which connects the point of intersection of the middle lower axis and the left steering axis and the rear wheel swing shaft and the link support. Namely, the power unit having a high rigidity is positioned between the linkage and the rear wheel swing shaft, and the power unit is connected to the lower frame. The support portion where the power unit is supported is provided on the lower frame. The lower frame may support the power unit via a member such as a bracket.

As in the vehicle according to International Patent Publication No. 2014/098228 which is different from the vehicle according to the preferred embodiments of the present invention, in the event that the power unit is provided behind the rear wheel swing shaft, the power unit which is a rigid body does not exist between the linkage and the rear wheel swing shaft. In addition, in the vehicle described above, a highly rigid member like the power unit is not provided between the linkage and the rear wheel swing shaft, and hence, it is difficult to enhance the rigidity of the body frame which connects the linkage and the rear wheel swing shaft. Then, in order to ensure the rigidity required of the body frame, the diameter of the body frame is increased, and further, interference of the body frame with other members is avoided, as a result of which the body frame tends to be enlarged in size.

However, according to a preferred embodiment of the present invention, the power unit which is a rigid body is disposed between the linkage and the rear wheel swing shaft, and the lower frame is connected to the linkage and the power unit. Because of this, the rigidity of the lower frame which connects the linkage and the power unit is easily enhanced by using the power unit which is a rigid body. Because of this, the lower frame is easy to be made small in size while ensuring the required rigidity. In addition, the power unit which is a rigid body supports the lower frame strongly and rigidly, and therefore, the lower frame supports the link support with high rigidity. This eliminates the necessity of increasing the diameter of the lower frame in order to enhance the rigidity thereof, and hence, it is possible to prevent the lower frame from interfering with the lower cross member, the right front wheel, the left front wheel, the right shock absorber, the left shock absorber, and the steering mechanism. In this way, the inventor discovered that the required rigidity is able to be ensured without enlarging the lower frame in size.

When the loads act on the link support, a compression load, a tensile load, and a bending load act on the upper frame and the lower frame. Among these loads, the dominant load is the bending load in considering the rigidity required of the upper frame and the lower frame.

In the event that the bending load acting on the lower frame from the link support, the bending moment acts on the lower frame in such a way that the connecting portion of the lower frame with the link support defines a point of action and the connecting portion of the lower frame with the power unit defines a fulcrum. As described above, the distance between the linkage and the power unit is short, and therefore, the bending moment acting on the lower frame becomes small, such that the rigidity required of the lower frame is reduced.

In addition, according to a preferred embodiment of the present invention, when the vehicle in the upright state is seen from the side thereof, the point of intersection of the straight line that passes the connecting portion of the lower frame with the power unit and intersects the middle lower axis at right angles and the upper edge of the upper frame is positioned above the point of intersection of the middle lower axis and the left steering axis in relation to the direction of the left steering axis. Namely, the upper frame easily follows the front-to-rear direction by disposing the upper edge of the upper frame at a high position. According to this structure, when the load acts on the upper frame in the front-to-rear direction, it is easy to make a component of the load that acts in an extending or contracting direction greater than a bending component thereof, such that it becomes easy to reduce the rigidity required of the upper frame.

For the reasons described above, it is easy to reduce the diameters of the upper frame and the lower frame while ensuring the required rigidity, such that the body frame is prevented from being enlarged in size. Additionally, the body frame is not enlarged in size, and therefore, it is easy to avoid interference of the lower cross member, the right front wheel, the left front wheel, the right shock absorber, the left shock absorber, and the steering mechanism with the upper frame and the lower frame, such that the entire vehicle is also prevented from being enlarged in size.

In the vehicle described above, the following structure may be used.

The upper frame and the lower frame are connected together via a connecting portion that is provided between the connecting portion of the lower frame with the link support and the connecting portion of the lower frame with the power unit when the vehicle in the upright state is seen from the side thereof.

The connecting portion that connects the upper frame and the lower frame together is provided between the connecting portion of the lower frame with the link support and the connecting portion of the lower frame with the power unit. This allows the upper frame to bear a portion of the bending load acting on the lower frame, and therefore, the rigidity required of the lower frame is able to be reduced.

In the vehicle described above, the following structure may be used.

The lower frame is connected to the link support below the lower cross member in relation to the direction of the left steering axis, and at least a portion of the upper frame is provided in the position where it overlaps the upper cross member when seen from the front of the middle upper axis.

The load acting on the link support from the upper cross member acts along the middle upper axis. The direction in which the upper frame extends easily coincides with the direction of the force that acts on the link support in the front-to-rear direction, such that the bending moment acting on the upper frame is easy to be reduced further. This makes it easy for the upper frame to be further reduced in diameter, such that it is easy to avoid interference with the upper cross member and the lower cross member.

In the vehicle described above, the following structure may be used.

The lower frame includes a lower right frame and a lower left frame which is provided on the left of the lower right frame in relation to the left-to-right direction of the vehicle, and the lower right frame is fixed to a right portion of the power unit, while the lower left frame is fixed to a left portion of the power unit.

In the event that the lower right frame is fixed to the right portion of the power unit, when the vehicle is seen from above, the lower right frame is easily disposed in such a way as to extend obliquely rightwards and rearwards from the link support towards the power unit.

In the event that the lower left frame is fixed to the left portion of the power unit, when the vehicle is seen from above, the lower left frame is easily disposed in such a way as to extend obliquely leftwards and rearwards from the link support towards the power unit.

Because of this, in the event that a component in the left-to-right direction of the load transmitted to the link support is great, the force in the left-to-right direction acts on the lower right frame and the lower left frame as a compression force or a tensile force, reducing a bending component. Namely, when the load acts on the lower right frame and the lower left frame, it is easy to make a component of the load that acts in an extending or contracting direction greater than the bending component thereof, such that it becomes easy to reduce the rigidity required of the lower right frame and the lower left frame. Because of this, the body frame is easy to be made small in size while ensuring the rigidity required of the lower right frame and the lower left frame.

In the vehicle described above, the following structure may be used.

When the vehicle in the upright state is seen from the side thereof, the upper edge of the upper frame is positioned above a line which connects a point of intersection of the middle lower axis and the left steering axis and the rear wheel swing shaft in relation to the direction of the left steering axis.

The orientation of the portion of the upper frame that extends rearwards from the link support easily follows the middle upper axis by disposing the entire upper edge of the upper frame at a high position. According to this structure, when the load acts on the upper frame in the front-to-rear direction, it is easy to make a component of the load that acts in an extending or contracting direction greater than a bending component thereof, such that it becomes easy to reduce the rigidity required of the upper frame.

In the vehicle described above, the following structure may be used.

The upper frame includes an upper right frame and an upper left frame that is provided on the left of the upper right frame in relation to the left-to-right direction of the vehicle, the lower frame includes a lower right frame and a lower left frame that is provided on the left of the lower right frame in relation to the left-to-right direction of the vehicle, the upper right frame and the lower right frame become integral behind a rear end of the linkage in relation to the direction of the middle lower axis, and the upper left frame and the lower left frame become integral behind the rear end of the linkage in relation to the direction of the middle lower axis.

The upper right frame and the lower right frame are integral, and therefore, the upper right frame bears a portion of a load acting on the lower right frame, and the lower right frame bears a portion of a load acting on the upper right frame.

The upper left frame and the lower left frame are integral, and therefore, the upper left frame bears a portion of a load acting on the lower left frame, and the lower left frame bears a portion of a load acting on the upper left frame.

In the vehicle described above, the following structure may be used.

The upper frame includes an upper right frame and an upper left frame that is provided on the left of the upper right frame in relation to the left-to-right direction of the vehicle, the lower frame includes a lower right frame and a lower left frame that is provided on the left of the lower right frame in relation to the left-to-right direction of the vehicle, and when the vehicle is seen from above, portions of the upper right frame, the upper left frame, the lower right frame, and the lower left frame that overlap the lower cross member are positioned at a central portion when the lower cross member is divided into three in the left-to-right direction.

The lower cross member turns about the middle lower axis. Because of this, even when the linkage is actuated to operate, the central portion of the lower cross member in the left-to-right direction is displaced less than the left portion and the right portion thereof. Because of this, interference of the upper right frame, the upper left frame, the lower right frame, and the lower left frame with the lower cross member is easily avoided, and hence, the upper right frame, the upper left frame, the lower right frame, and the lower left frame are easily disposed near the lower cross member. This prevents the enlargement in size of the vehicle.

In the vehicle described above, the following structure may be used.

The lower right frame and the lower left frame include a portion that is positioned below the middle lower axis in relation to the direction of the left steering axis ahead of a rear edge of a movable range of the right front wheel and the left front wheel in relation to the direction of the middle lower axis when the vehicle in the upright state is seen from the side thereof.

When the vehicle is seen from above, the portions of the lower right frame and the lower left frame that overlap the lower cross member are positioned in the central portion when the lower cross member is divided into three in the left-to-right direction, and the lower right frame and the lower left frame are made difficult to interfere with the lower cross member. In addition, even when the linkage is actuated to operate, causing the right front wheel and the left front wheel to move up and down, the right front wheel, the right shock absorber, the left front wheel, and the left shock absorber are made difficult to enter the central portion, compared with the right front wheel and the left front wheel entering the right portion and the left portion when the lower cross member is divided into three in the left-to-right direction. Because of this, even though the lower right frame and the lower left frame are disposed below the lower middle axis in relation to the direction of the left steering axis, the lower right frame, and the lower left frame are made difficult to interfere with the lower cross member, the right front wheel, the left front wheel, the right shock absorber and the left shock absorber.

In the vehicle described above, the following structure may be used.

When the vehicle in the upright state is seen from the side thereof, the connecting portion of the lower frame with the power unit is positioned ahead of a middle point of the line that connects the point of intersection of the middle lower axis and the left steering axis and the rear wheel swing shaft.

The distance between the point of action and the fulcrum of the lower frame when the bending moment acts on the lower frame is easily decreased, such that the bending moment acting is reduced. Because of this, the lower frame is easy to be made small in size, and interference of the lower frame with the upper cross member, the lower cross member, the right front wheel, and the left front wheel is easily avoided, such that the body frame is prevented from being enlarged in size.

In the vehicle described above, the following structure may be used.

The lower frame includes a lower right frame and a lower left frame that is provided on the left of the lower right frame, the lower right frame includes a front lower right frame that is positioned ahead of a connecting portion with the power unit when the vehicle in the upright state is seen from the side thereof and a rear lower right frame that is positioned behind a rear end of the front lower right frame and that is welded to the front lower right frame, the lower left frame includes a front lower left frame that is positioned ahead of a connecting portion with the power unit when the vehicle in the upright state is seen from the side thereof and a rear lower left frame that is positioned behind a rear end of the front lower left frame and that is welded to the front lower left frame, the upper frame includes an upper right frame and an upper left frame that is positioned on the left of the upper right frame, the upper right frame includes a front upper right frame that is positioned ahead of a connecting portion with the power unit when the vehicle in the upright state is seen from the side thereof and a rear upper right frame that is positioned behind a rear end of the front upper right frame and that is welded to the front upper right frame, and the upper left frame includes a front upper left frame that is positioned ahead of a connecting portion with the power unit when the vehicle in the upright state is seen from the side thereof and a rear upper left frame that is positioned behind a rear end of the front upper left frame and that is welded to the front upper left frame.

A tool is easy to place to machine a shaft portion of the link support which supports the lower cross member, such that the structure accuracy of the shaft portion is easily enhanced.

In addition, according to a preferred embodiment of the present invention, the following is provided.

A vehicle includes a body frame that leans to the right of the vehicle when the vehicle turns right and to the left of the vehicle when the vehicle turns left; a right front wheel and a left front wheel aligned side by side in a left-to-right direction of the body frame; a rear wheel that is disposed behind the right front wheel and the left front wheel and able to swing about a rear wheel swing shaft that is provided on the body frame; a power unit that drives the rear wheel; a right shock absorber that supports the right front wheel at a lower portion thereof and that attenuates an upward displacement of the right front wheel in an up-to-down direction of the body frame; a left shock absorber that supports the left front wheel at a lower portion thereof and that attenuates an upward displacement of the left front wheel in the up-to-down direction of the body frame; and a linkage including a right side member that supports an upper portion of the right shock absorber so as to allow the upper portion to turn about a right steering axis that extends in the up-to-down direction of the body frame; a left side member that supports an upper portion of the left shock absorber so as to allow the upper portion to turn about a left steering axis that is parallel to the right steering axis; an upper cross member that supports an upper portion of the right side member at a right end portion thereof so as to allow the upper portion to turn about a right upper axis that extends in a front-to-rear direction of the body frame, and that supports an upper portion of the left side member at a left end portion thereof so as to allow the upper portion to turn about a left upper axis that is parallel to the right upper axis, the middle portion of the upper cross member being supported on the body frame so as to turn about a middle upper axis that is parallel to the right upper axis and the left upper axis; and a lower cross member that supports a lower portion of the right side member at a right end portion thereof so as to allow the lower portion to turn about a right lower axis that is parallel to the right upper axis, and that supports a lower portion of the left side member at a left end portion thereof so as to allow the lower portion to turn about a left lower axis that is parallel to the left upper axis, the middle portion of the lower cross member being supported on the body frame so as to turn about a middle lower axis that is parallel to the middle upper axis, wherein the body frame connects at least the linkage and the rear wheel swing shaft together, the body frame includes a link support that supports the middle portion of the upper cross member and the middle portion of the lower cross member so as to allow the middle portions to turn above the right front wheel and the left front wheel; a lower frame that connects the power unit that is provided in a position where at least a portion of the power unit overlaps a line that connects a point of intersection of the middle lower axis and the left steering axis and the rear wheel swing shaft and the link support when the vehicle in an upright state is seen from a side thereof; and an upper frame that is connected to the link support above a connecting portion of the lower frame with the link support in relation to the direction of the left steering axis and that extends rearwards to at least a connecting portion of the lower frame with the power unit in relation to the direction of the middle lower axis, the lower frame includes a lower right frame and a lower left frame that is provided on the left of the lower right frame, the lower right frame includes a front lower right frame that is positioned ahead of a connecting portion with the power unit when the vehicle in the upright state is seen from the side thereof and a rear lower right frame that is positioned behind a rear end of the front lower right frame and that is welded to the front lower right frame, the lower left frame includes a front lower left frame that is positioned ahead of the connecting portion with the power unit when the vehicle in the upright state is seen from the side thereof and a rear lower left frame that is positioned behind a rear end of the front lower left frame and that is welded to the front lower left frame, the upper frame includes an upper right frame and an upper left frame that is positioned on the left of the upper right frame, the upper right frame includes a front upper right frame that is positioned ahead of a connecting portion with the power unit when the vehicle in the upright state is seen from the side thereof and a rear upper right frame that is positioned behind a rear end of the front upper right frame and that is welded to the rear upper right frame, and the upper left frame includes a front upper left frame that is positioned ahead of the connecting portion with the power unit when the vehicle in the upright state is seen from the side thereof and a rear upper left frame that is positioned behind a rear end of the front upper left frame and that is welded to the front upper left frame.

According to various preferred embodiments of the present invention, the portion that supports the linkage with high rigidity and to which the elements of the linkage positioned behind the link support are attached is easily machined.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
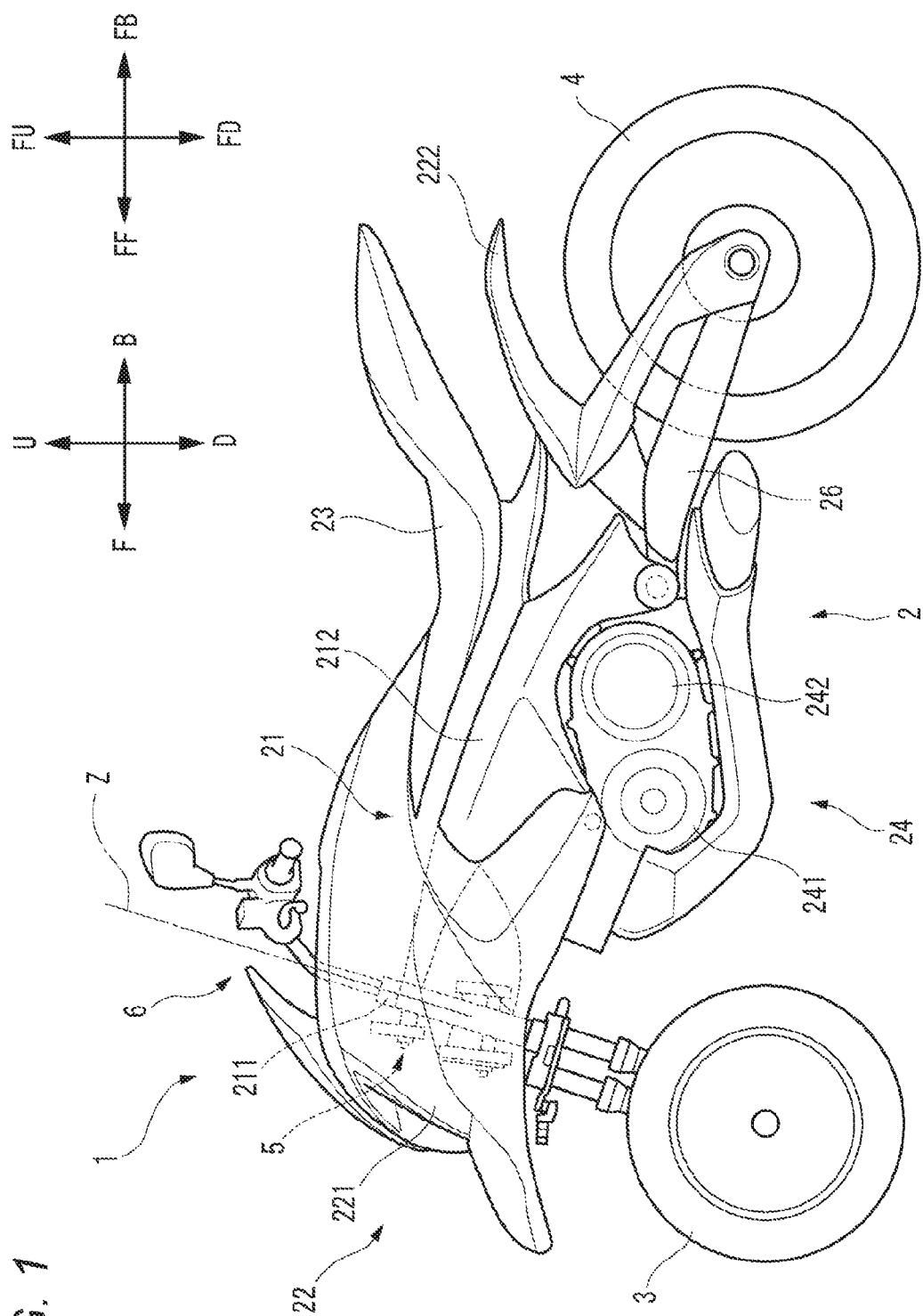
FIG. 1 is a side view showing an entire vehicle according to a preferred embodiment of the present invention as seen from a left side thereof.

Referring to the accompanying drawings, preferred embodiments of the present invention will be described in detail below.

In the accompanying drawings, an arrow F denotes a forward direction of a vehicle. An arrow B denotes a backward or rearward direction of the vehicle. An arrow U denotes an upward direction of the vehicle. An arrow D denotes a downward direction of the vehicle. An arrow R denotes a rightward direction of the vehicle. An arrow L denotes a leftward direction of the vehicle.

The vehicle turns by causing a body frame to lean to the left or right of the vehicle with respect to a vertical direction. Then, in addition to the directions based on the vehicle, directions based on the body frame will be defined. In the accompanying drawings, an arrow FF denotes a forward direction of the body frame. An arrow FB denotes a backward or rearward direction of the body frame. An arrow FU denotes an upward direction of the body frame. An arrow FD denotes a downward direction of the body frame. An arrow FR denotes a rightward direction of the body frame. An arrow FL denotes a leftward direction of the body frame.

When referred to in this specification, a "front-to-rear direction of the body frame," a "left-to-right direction of the body frame" and an "up-to-down direction of the body frame" mean a front-to-rear direction, a left-to-right direction and an up-to-down direction based on the body frame as viewed from a rider who rides the vehicle. When referred to, "to a side of or sideways of the body frame" means rightwards or leftwards in the left-to-right direction of the vehicle.

When referred to in this specification, "extending in the front-to-rear direction of the body frame" includes extending while being inclined with respect to the front-to-rear direction of the body frame and means extending while being inclined more towards the front-to-rear direction of the body frame than being inclined towards the left-to-right direction and the up-to-down direction of the body frame.

When referred to in this specification, "extending in the left-to-right direction of the body frame" includes extending while being inclined with respect to the left-to-right direction of the body frame and means extending while being inclined more towards the left-to-right direction of the body frame than being inclined towards the front-to-rear direction and the up-to-down direction of the body frame.

When referred to in this specification, "extending in the up-to-down direction of the body frame" includes extending while being inclined with respect to the up-to-down direction of the body frame and means extending while being inclined more towards the up-to-down direction of the body frame than being inclined towards the front-to-rear direction and the left-to-right direction of the body frame.

When referred to in this specification, an "upright state of the body frame" means a state in which the vehicle is not steered and the up-to-down direction of the body frame coincides with the vertical direction. In this state, the direction based on the vehicle and the direction based on the body frame coincide with each other. When the vehicle is turning while the body frame is leaning in the left-to-right direction with respect to the vertical direction, the left-to-right direction of the vehicle does not coincide with the left-to-right direction of the body frame. Also, the up-to-down direction of the vehicle does not coincide with the up-to-down direction of the body frame. However, the front-to-rear direction of the vehicle coincides with the front-to-rear direction of the body frame.

When referred to in this specification, "directly on the left of a member A in the left-to-right direction of the body frame" denotes a space through which the member A passes when the member A is translated to the left in the left-to-right direction of the body frame. "Directly on the right of the member A" is also defined similarly.

When referred to in this specification, "on the left of the member A in the left-to-right direction of the body frame" includes not only a space through which the member A passes when the member A is translated to the left in the left-to-right direction of the body frame but also a space which extends from the space in directions which are at right angles to the left-to-right direction of the body frame. "On the right of the member A" is also defined similarly.

When referred to in this specification, "directly above the member A in the up-to-down direction of the body frame" denotes a space through which the member A passes when the member A is translated upwards in the up-to-down direction of the body frame. "Directly below the member A" is also defined similarly.

When referred to in this specification, "above the member A in the up-to-down direction of the body frame" includes not only a space through which the member A passes when the member A is translated upwards in the up-to-down direction of the body frame but also a space which extends from the space in directions which are at right angles to the up-to-down direction of the body frame. "Below the member A" is also defined similarly.

When referred to in this specification, "directly ahead of the member A in the front-to-rear direction of the body frame" denotes a space through which the member A passes when the member A is translated to the front in the front-to-rear direction of the body frame. "Directly behind the member A" is also defined similarly.

When referred to in this specification, "ahead of the member A in the front-to-rear direction of the body frame" includes not only a space through which the member A passes when the member A is translated to the front in the front-to-rear direction of the body frame but also a space which extends from the space in directions which are at right angles to the front-to-rear direction of the body frame. "Behind the member A" is also defined similarly.

Referring to FIGS. 1 to 11, a vehicle 1 according to preferred embodiments of the present invention will be described. The vehicle 1 is a vehicle that includes a body frame that leans and two front wheels aligned side by side in the left-to-right direction of the body frame.

As shown in FIG. 1, the vehicle 1 includes a vehicle main body portion 2, two front wheels 3, a rear wheel 4, a linkage 5 and a steering mechanism 6.

The vehicle main body 2 includes a body frame 21, a body cover 22, a seat 23, a power unit 24, and a rear arm 26. In FIG. 1, the body frame 21 is in the upright state. The following description which refers to FIG. 1 will be made on the premise that the body frame 21 is in the upright state. FIG. 1 is a left side view resulting when the entire vehicle 1 is seen from the left in the left-to-right direction of the body frame 21.

The body frame 21 includes a headstock 211 and a main frame 212. In FIG. 1, a portion of the body frame 21 that is hidden by the body cover 22 is indicated by broken lines. The body frame 21 supports the seat 23 and the power unit 24.

The headstock 211 is disposed at a front portion of the vehicle 1. When looking at the vehicle 1 from the left in the left-to-right direction of the body frame 21, an upper portion of the headstock 211 is disposed behind a lower portion of the headstock 211 in the front-to-rear direction of the body frame 21.

The main frame 212 is connected to the headstock 211. The main frame 212 is disposed behind the headstock 211 in the front-to-rear direction of the body frame 21. The main frame 212 supports the seat 23, the power unit 24 and the rear arm 26.

The rear arm 26 is disposed behind the main frame 212 in the front-to-rear direction of the body frame 21. The rear arm 26 extends in the front-to-rear direction of the body frame 21. A front end portion of the rear arm 26 is supported on the main frame 212 and is allowed to turn about an axis that extends in the left-to-right direction of the body frame 21. A rear end portion of the rear arm 26 supports the rear wheel 4.

The body cover 22 includes a front cover 221 and a rear mudguard 222. The body cover 22 is a body component that covers at least a portion of a group of components of the vehicle 1 such as the two front wheels 3, the body frame 21, the linkage 5 and the steering mechanism 6.

The front cover 221 is disposed ahead of the seat 23 in the front-to-rear direction of the body frame 21. The front cover 221 covers the linkage 5 and at least a portion of the steering mechanism 6. The front cover 221 is disposed so as not to be displaced relative to the body frame 21.

At least a portion of the rear mudguard 222 is disposed directly above the rear wheel 4 in the up-to-down direction of the body frame 21. The rear mudguard 222 is disposed so as not to be displaced relative to the rear arm 26.

The two front wheels 3 are disposed below the headstock 211 in the up-to-down direction of the body frame 21. At least a portion of the two front wheels 3 is disposed directly below the front cover 221 in the up-to-down direction of the body frame 21.

At least a portion of the rear wheel 4 is disposed below the seat 23 in the up-to-down direction of the body frame 21. At least a portion of the rear wheel 4 is disposed directly below the rear mudguard 223 in the up-to-down direction of the body frame 21.

The vehicle 1 is preferably a vehicle on which the rider mounts in a posture of straddling the body frame 21. Namely, when riding the vehicle 1, a portion of the body frame 21 which is disposed ahead of the seat 23 on which the rider sits in the front-to-rear direction of the body frame 21 is disposed between the legs of the rider. The rider rides the vehicle 1 in a posture of holding the main frame 212 or the front cover 221 that is positioned ahead of the seat 23 in the front-to-rear direction of the body frame 21 by the legs therebetween.

When looking at the vehicle 1 from the left-to-right direction of the body frame 21, the power unit 24 is disposed ahead of a front end of the rear wheel 4 in the front-to-rear direction of the body frame 21. The power unit 24 is disposed so as not to be displaced relative to the body frame 21. The power unit 24 is disposed so as not to be displaced relative to the main frame 212. The power unit 24 includes an engine 241 and a speed changer 242. The engine 241 produces a force with which the vehicle 1 is driven. The speed changer 242 is a mechanism which transmits a driving force produced by the engine 241 to the rear wheel 4 and which changes the rotating speed of the rear wheel 4. The speed changer 242 includes a gear box and a clutch. The speed changer 242 includes a speed changing or transmission mechanism. The transmission mechanism may be a multiple-speed transmission mechanism including a plurality of gears or a continuously variable transmission (CVT).

Figure 2:
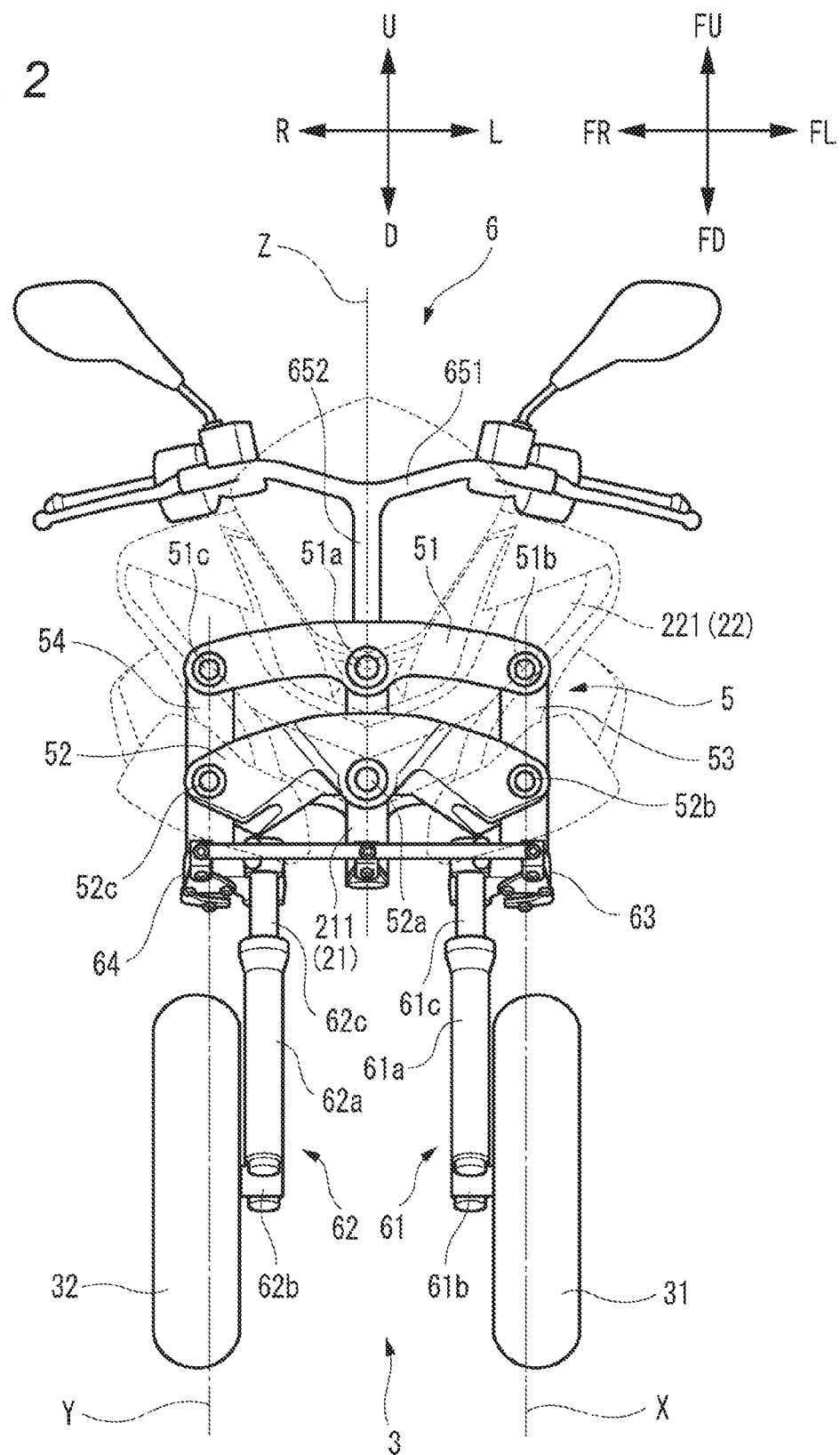
FIG. 2 is a front view of the vehicle shown in FIG. 1 showing a front portion thereof.

FIG. 2 is a front view of the front portion of the vehicle 1 as seen from the front in the front-to-rear direction of the body frame 21. In FIG. 2, the body frame 21 is in the upright state. The following description which refers to FIG. 2 will be made on the premise that the body frame 21 is in the upright state. In FIG. 2, the vehicle 1 is depicted as seen through the body cover 22 which is indicated by broken lines.

The two front wheels 3 include a left front wheel 31 and a right front wheel 32. The left front wheel 31 is disposed on the left of the headstock 211 which defines a portion of the body frame 21 in the left-to-right direction of the body frame 21. The right front wheel 32 is disposed below the headstock 211 in the up-to-down direction of the body frame 21. The left front wheel 31 and the right front wheel 32 are aligned side by side in the left-to-right direction of the body frame 21.

The steering mechanism 6 includes a left shock absorber 61, a right shock absorber 62, a left bracket 63 and a right bracket 64.

The left shock absorber 61 includes a left lower portion 61a. The left lower portion 61a supports the left front wheel 31. The left lower portion 61a extends in the up-to-down direction of the body frame 21. The left lower portion 61a includes a left support portion 61b at a lower end portion thereof. The left front wheel 31 is supported on the left support portion 61b.

The left shock absorber 61 includes a left upper portion 61c. The left upper portion 61c extends in the up-to-down direction of the body frame 21. The left upper portion 61c is disposed directly above the left lower portion 61a in the up-to-down direction of the body frame 21 with a portion thereof inserted in the left lower portion 61a. An upper portion of the left lower portion 61a is fixed to the left bracket 63.

The left shock absorber 61 is preferably a so-called telescoping shock absorber. The left upper portion 61c moves relatively in a direction in which the left lower portion 61a extends to the left lower portion 61a, such that the left shock absorber 61 can extend and contract in the direction concerned. This enables the left shock absorber 61 to attenuate a displacement in the up-to-down direction of the body frame 21 of the left front wheels 31 towards the left upper portion 61c.

The right shock absorber 62 includes a right lower portion 62a. The right lower portion 62a supports the right front wheel 32. The right lower portion 62a extends in the up-to-down direction of the body frame 21. The right lower portion 62a includes a right support portion 62b at a lower end portion thereof. The right front wheel 32 is supported on the right support portion 62b.

The right shock absorber 62 includes a right upper portion 62c. The right upper portion 62c extends in the up-to-down direction of the body frame 21. The right upper portion 62c is disposed directly above the right lower portion 62a in the up-to-down direction of the body frame 21 with a portion thereof inserted in the right lower portion 62a. An upper portion of the right lower portion 62a is fixed to the right bracket 64.

The right shock absorber 62 is preferably a so-called telescoping shock absorber. The right upper portion 62c moves relatively in a direction in which the right lower portion 62a extends to the right lower portion 62a, such that the right shock absorber 62 is able to extend and contract in the direction concerned. This enables the right shock absorber 62 to attenuate an upward displacement in the up-to-down direction of the body frame 21 of the right front wheels 32 towards the right upper portion 62c.

The steering mechanism 6 includes a steering effort transmission mechanism 65. The steering effort transmission mechanism 65 includes a handlebar 651 and a steering shaft 652. The handlebar 651 is attached to an upper portion of the steering shaft 652. The steering shaft 652 is supported on the headstock 211 at a portion thereof so as to turn. A middle steering axis Z of the steering shaft 652 extends in the up-to-down direction of the body frame 21. As shown in FIG. 1, the upper portion of the steering shaft 652 is disposed behind a lower portion thereof in the front-to-rear direction of the body frame 21. Consequently, the central steering axis Z of the steering shaft 652 is inclined in the front-to-rear direction of the body frame 21. The steering shaft 652 turns about the middle steering axis Z in response to the operation of the handlebar 651 by the rider.

The steering effort transmission mechanism 65 transmits a steering effort with which the rider operates the handlebar 651 to the left bracket 63 and the right bracket 64. A specific structure will be described in detail below.

In the vehicle 1 according to this preferred embodiment, the linkage 5 preferably includes a four parallel joint link system (also referred to as a parallelogram link).

As shown in FIG. 2, the linkage 5 is disposed below the handlebar 651 in the up-to-down direction of the body frame 21. The linkage 5 disposed above the left front wheel 31 and the right front wheel 32 in the up-to-down direction of the body frame 21. The linkage 5 includes an upper cross member 51, a lower cross member 52, a left side member 53 and a right side member 54. The linkage 5 is not interlocked with the turning of the steering shaft 652 about the middle steering axis Z associated with the operation of the handlebar 651. Namely, the linkage 5 does not turn about the middle steering axis Z relative to the body frame 21.

A middle portion of the upper cross member 51 is supported on the headstock 211 by a support portion 51a. The upper cross member 51 is able to turn relative to the headstock 211 about a middle upper axis that passes through the support portion 51a to extend in the front-to-rear direction of the body frame 21.

A left end portion of the upper cross member 51 is supported on the left side member 53 by a support portion 51b. The upper cross member 51 is able to turn relative to the left side member 53 about a left upper axis which passes through the support portion 51b to extend in the front-to-rear direction of the body frame 21.

A right end portion of the upper cross member 51 is supported on the right side member 54 by a support portion 51c. The upper cross member 51 is able to turn relative to the right side member 54 about a right upper axis which passes through the support portion 51c to extend in the front-to-rear direction of the body frame 21.

A middle portion of the lower cross member 52 is supported on the headstock 211 by a support portion 52a. The lower cross member 52 is able to turn about a middle lower axis which passes through the support portion 52a to extend in the front-to-rear direction of the body frame 21.

A left end portion of the lower cross member 52 is supported on the left side member 53 by a support portion 52b. The lower cross member 52 is able to turn about a left lower axis which passes through the support portion 52b to extend in the front-to-rear direction of the body frame 21.

A right end portion of the lower cross member 52 is supported on the right side member 54 by a support portion 52c. The lower cross member 52 is able to turn about a right lower axis which passes through the support portion 52c to extend in the front-to-rear direction of the body frame 21.

The middle upper axis, the right upper axis, the left upper axis, the middle lower axis, the right lower axis and the left lower axis extend parallel to one another. The middle upper axis, the right upper axis, the left upper axis, the middle lower axis, the right lower axis and the left lower axis are disposed above the left front wheel 31 and the right front wheel 32 in the up-to-down direction of the body frame 21.

Figure 3:
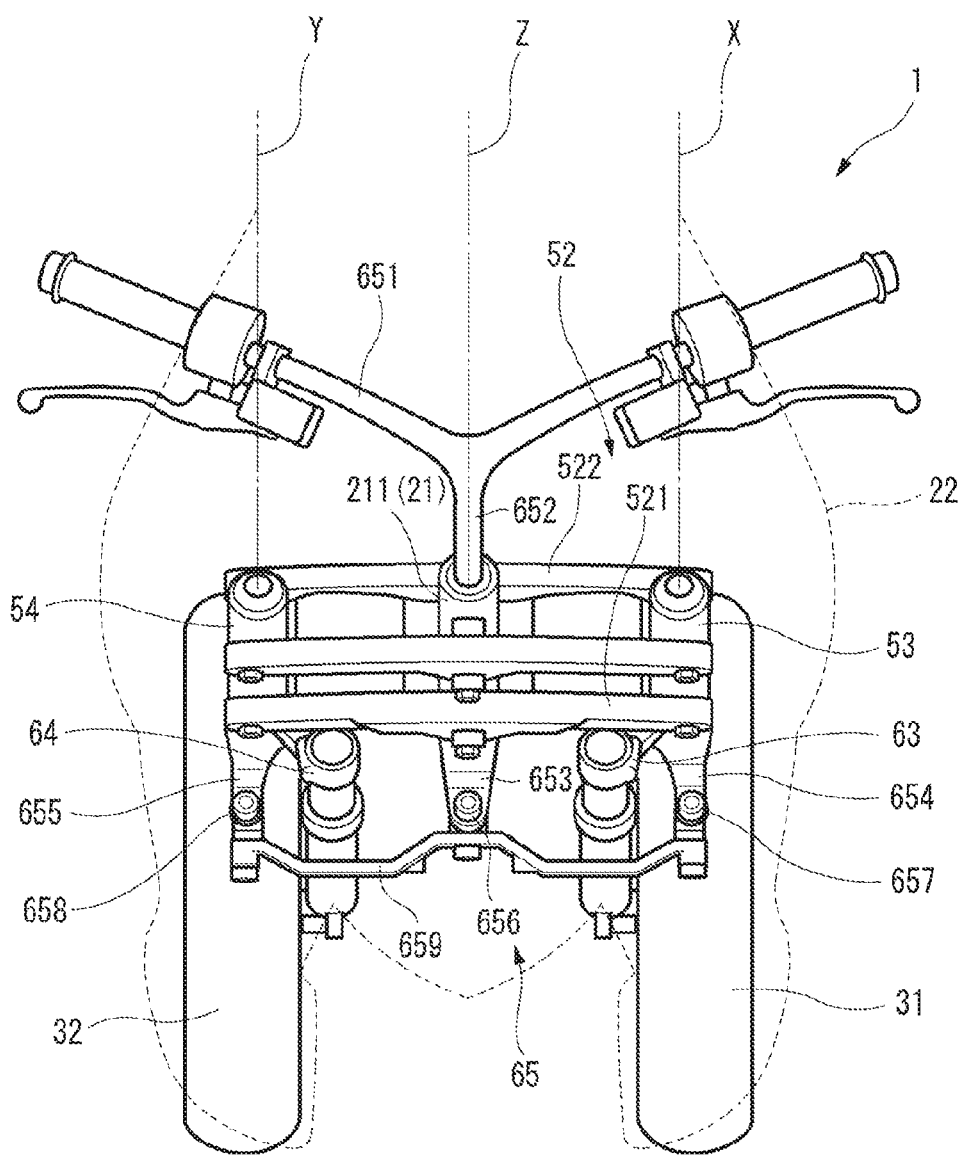
FIG. 3 is a plan view showing the front portion of the vehicle shown in FIG. 1.

FIG. 3 is a plan view of the front portion of the vehicle 1 as seen from above in the up-to-down direction of the body frame 21. In FIG. 3, the body frame 21 is in the upright state. The following description which refers to FIG. 3 will be made on the premise that the body frame 21 is in the upright state. In FIG. 3, the vehicle 1 is depicted as seen through the body cover 22 which is indicated by broken lines.

The upper cross member 51 is disposed ahead of the headstock 211 in the front-to-rear direction of the body frame 21. The upper cross member 51 is a plate-shaped member that extends in the left-and-right direction of the vehicle body frame 21.

The lower cross member 52 includes a front plate-shaped member 521 and a rear plate-shaped member 522. The front plate-shaped member 521 is disposed ahead of the headstock 211 in the front-to-rear direction of the body frame 21. The rear plate-shaped member 522 is disposed behind the headstock 211 in the front-to-rear direction of the body frame 21. The front plate-shaped member 521 and the rear plate-shaped member 522 extend in the left-to-right direction of the body frame 21. The lower cross member 52 is disposed below the upper cross member 51 in the up-and-down direction of the body frame 21. A length dimension of the lower cross member 52 in the left-to-right direction of the body frame 21 is the same as or equal to a length dimension of the upper cross member 51 in the left-to-right direction of the body frame 21. The lower cross member 52 extends parallel to the upper cross member 51.

As shown in FIGS. 2 and 3, the left side member 53 is disposed directly on the left of the headstock 211 in the left-to-right direction of the body frame 21. The left side member 53 is disposed above the left front wheel 31 in the up-to-down direction of the body frame 21. The left side member 53 extends in a direction in which the headstock 211 extends. The left side member 53 extends in a direction in which the middle steering axis Z of the steering shaft 652 extends. An upper portion of the left side member 53 is disposed behind a lower portion thereof in the front-to-rear direction of the body frame 21.

The left bracket 63 includes a left turning member, not shown, at an upper portion thereof. The left turning member is disposed in an interior of the left side member 53 and extends in the same orientation as the direction in which the left side member 53 extends. The left turning member is able to turn about the left steering axis X relative to the left side member 53. Namely, the left bracket 63 is able to turn about the left steering axis X relative to the left side member 53. The left steering axis X extends in the direction in which the left side member 53 extends. As shown in FIG. 2, the left steering axis X extends parallel to the middle steering axis Z of the steering shaft 652 in the up-to-down direction of the body frame 21. As shown in FIG. 3, the left steering axis X extends parallel to the middle steering axis Z of the steering shaft 652 in the front-to-rear direction of the body frame 21.

As shown in FIGS. 2 and 3, the right side member 54 is disposed directly on the right of the headstock 211 in the left-to-right direction of the body frame 21. The right side member 54 is disposed above the right front wheel 32 in the up-to-down direction of the body frame 21. The right side member 54 extends in the direction in which the headstock 211 extends. The right side member 54 extends in the direction in which the middle steering axis Z of the steering shaft 652 extends. An upper portion of the right side member 54 is disposed behind a lower portion thereof in the front-to-rear direction of the body frame 21.

The right bracket 64 includes a right turning member, not shown, at an upper portion thereof. The right turning member is disposed in an interior of the right side member 54 and extends in the same orientation as the direction in which the right side member 54 extends. The right turning member is able to turn about a right steering axis Y relative to the right side member 54. Namely, the right bracket 64 is able to turn about the right steering axis Y relative to the right side member 54. The right steering axis Y extends in the direction in which the right side member 54 extends. As shown in FIG. 2, the right steering axis Y extends parallel to the middle steering axis Z of the steering shaft 652 in the up-to-down direction of the body frame 21. As shown in FIG. 3, the right steering axis Y extends parallel to the middle steering axis Z of the steering shaft 652 in the front-to-rear direction of the body frame 21.

Thus, as includes been described above, the upper cross member 51, the lower cross member 52, the left side member 53 and the right side member 54 are supported on the body frame 21 so that the upper cross member 51 and the lower cross member 52 are held in postures which are parallel to each other and so that the left side member 53 and the right side member 54 are held in postures which are parallel to each other.

As shown in FIGS. 2 and 3, the steering effort transmission mechanism 65 includes, in addition to the handlebar 651 and the steering shaft 652 that have been described above, a middle transmission plate 653, a left transmission plate 654, a right transmission plate 655, a middle joint 656, a left joint 657, a right joint 658 and a tie-rod 659.

The middle transmission plate 653 is connected to the lower portion of the steering shaft 652. The middle transmission plate 653 cannot turn relative to the steering shaft 652. The middle transmission plate 653 is able to turn about the middle turning axis Z of the steering shaft 652 relative to the headstock 211.

The left transmission plate 654 is disposed directly on the left of the middle transmission plate 653. The left transmission plate 654 is connected to a lower portion of the left bracket 63. The left transmission plate 654 cannot turn relative to the left bracket 63. The left transmission plate 654 is able to turn about the left steering axis X relative to the left side member 53.

The right transmission plate 655 is disposed directly on the right of the middle transmission plate 653 in the left-to-right direction of the body frame 21. The right transmission plate 655 is connected to a lower portion of the right bracket 64. The right transmission plate 655 cannot turn relative to the right bracket 64. The right transmission plate 655 is able to turn about the right steering axis Y relative to the right side member 54.

As shown in FIG. 3, the middle joint 656 is connected to a front portion of the middle transmission plate 653 via a shaft portion that extends in the up-to-down direction of the body frame 21. The middle transmission plate 653 and the middle joint 656 are able to turn relatively about the shaft portion. The left joint 657 is disposed on the left of the middle joint 656 in the left-to-right direction of the body frame 21. The left joint 657 is connected to a front portion of the left transmission plate 654 via a shaft portion that extends in the up-to-down direction of the body frame 21. The left transmission plate 654 and the left joint 657 are able to turn relatively about the shaft portion. The right joint 658 is disposed on the right of the middle joint 656 in the left-to-right direction of the body frame 21. The right joint 658 is connected to a front portion of the right transmission plate 655 via a shaft portion that extends in the up-to-down direction of the body frame. The right transmission plate 655 and the right joint 658 is able to turn relatively about the shaft portion.

A shaft portion which extends in the front-to-rear direction of the body frame 21 is provided at a front portion of the middle joint 656. A shaft portion which extends in the front-to-rear direction of the body frame 21 is provided at a front portion of the left joint 657. A shaft portion which extends in the front-to-rear direction of the body frame 21 is provided at a front portion of the right joint 658. The tie-rod 659 extends in the left-and-right direction of the body frame 21. The tie-rod 659 is connected to the middle joint 656, the left joint 657, and the right joint 658 via these shaft portions. The tie-rod 659 and the middle joint 656 are able to turn relatively about the shaft portion that is provided at the front portion of the middle joint 656. The tie-rod 659 and the left joint 657 are able to turn relatively about the shaft portion that is provided at the front portion of the left joint 657. The tie-rod 659 and the right joint 658 are able to turn relatively about the shaft portion which is provided at the front portion of the right joint 658.

The left transmission plate 654 is connected to the middle transmission plate 653 via the left joint 657, the tie-rod 659 and the middle joint 656. The right transmission plate 655 is connected to the middle transmission plate 653 via the right joint 658, the tie-rod 659 and the middle joint 656. The left transmission plate 654 and the right transmission plate 655 are connected to each other via the left joint 657, the tie-rod 659 and the right joint 658.

Figure 4:
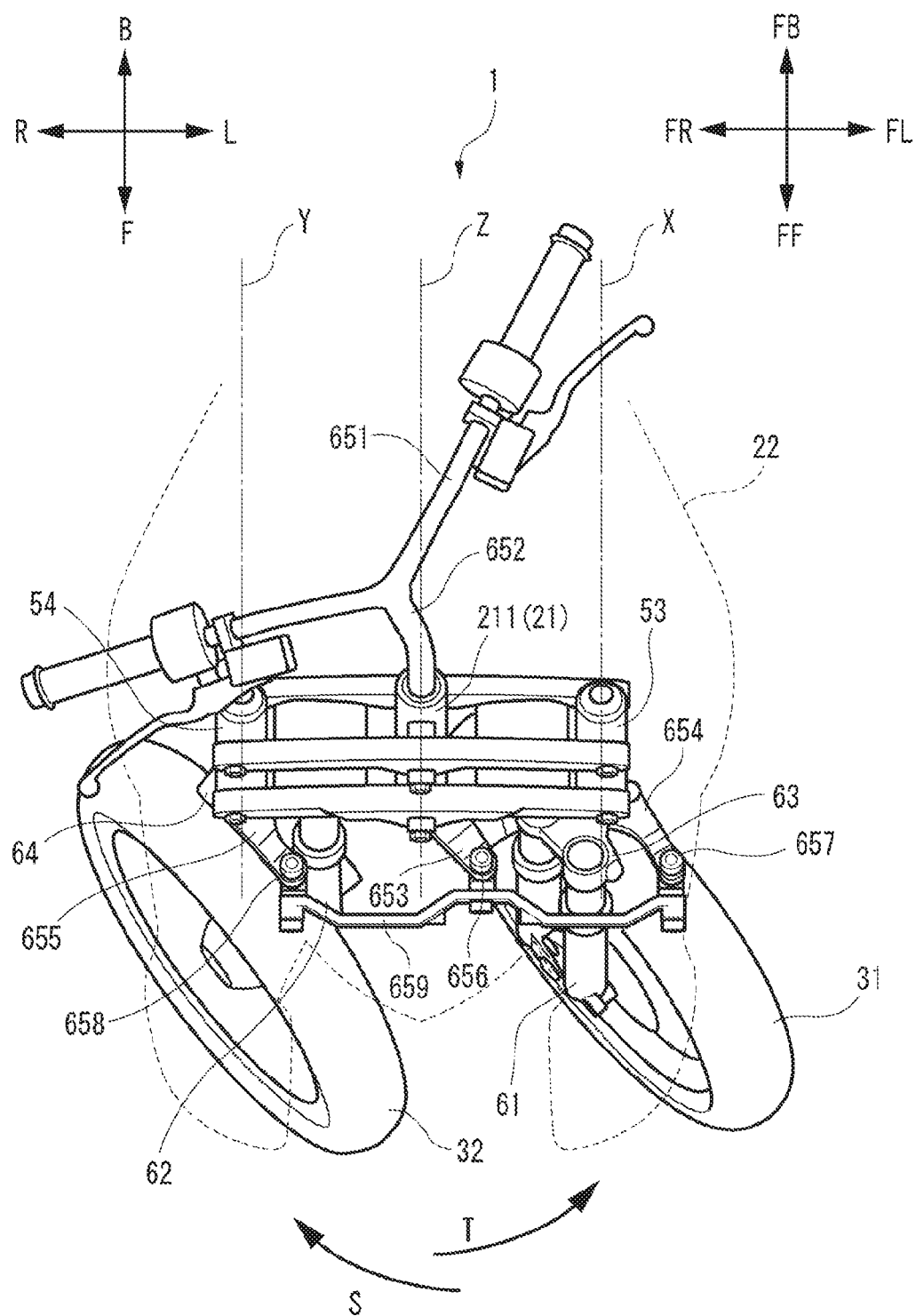
FIG. 4 is a plan view showing the front portion of the vehicle shown in FIG. 1 when the vehicle is steered.

Next, referring to FIGS. 3 and 4, a steering operation of the vehicle 1 will be described. FIG. 4 is a plan view of the front portion of the vehicle 1 as viewed from above in the up-to-down direction of the body frame 21 with the left front wheel 31 and the right front wheel 32 turned to the left. In FIG. 4, the vehicle 1 is depicted as seen through the body cover 22 which is indicated by broken lines.

When the rider operates the handlebar 651, the steering shaft 652 turns about the middle steering axis Z relative to the headstock 211. When the handlebar 651 is turned to the left as shown in FIG. 4, the steering shaft 652 turns in a direction indicated by an arrow T. In association with turning of the steering shaft 652, the middle transmission plate 653 turns in the direction indicated by the arrow T about the middle steering axis Z relative to the headstock 211.

In association with the turning of the middle transmission plate 653 in the direction indicated by the arrow T, the middle joint 656 of the tie-rod 659 turns relative to the middle transmission plate 653 in a direction indicated by an arrow S. The tie-rod 659 moves to the left in the left-to-right direction of the body frame 21 and to the rear in the front-to-rear direction of the body frame 21 while maintaining its posture.

In association with the movement of the tie-rod 659, the left joint 657 and the right joint 658 of the tie-rod 659 turn in the direction indicated by the arrow S relative to the left transmission plate 654 and the right transmission plate 655, respectively. This causes the left transmission plate 654 and the right transmission plate 655 to turn in the direction indicated by the arrow T while the tie-rod 659 maintains its posture as it is.

When the left transmission plate 654 turns in the direction indicated by the arrow T, the left bracket 63, which cannot turn relative to the left transmission plate 654, turns in the direction indicated by the arrow T about the left steering axis X relative to the left side member 53.

When the right transmission plate 655 turns in the direction indicated by the arrow T, the right bracket 64, which cannot turn relative to the right transmission plate 655, turns in the direction indicated by the arrow T about the right steering axis Y relative to the right side member 54.

When the left bracket 63 turns in the direction indicated by the arrow T, the left shock absorber 61, which is connected to the left bracket 63, turns in the direction indicated by the arrow T about the left steering axis X relative to the left side member 53. When the left shock absorber 61 turns in the direction indicated by the arrow T, the left front wheel 31, which is supported on the left shock absorber 61 via the left support portion 61b, turns in the direction indicated by the arrow T about the left steering axis X relative to the left side member 53.

When the right bracket 64 turns in the direction indicated by the arrow T, the right shock absorber 62, which is supported on the right bracket 64, turns in the direction indicated by the arrow T about the right steering axis Y relative to the right side member 54. When the right shock absorber 62 turns in the direction indicated by the arrow T, the right front wheel 32, which is supported on the right shock absorber 62 via the right support portion 62b, turns in the direction indicated by the arrow T about the right steering axis Y relative to the right side member 54.

When the rider operates the handlebar 651 so as to turn the vehicle 1 to the right, the elements described above turn in opposite directions to the directions in which they turn when the vehicle turns to the left. Since the elements move the other way around in relation to the left-to-right direction, the detailed description thereof will be omitted here.

Thus, as described heretofore, the steering mechanism 6 transmits the steering effort to the left front wheel 31 and the right front wheel 32 in response to the operation of the handlebar 651 by the rider. The left front wheel 31 and the right front wheel 32 turn about the left steering axis X and the right steering axis Y, respectively, in the direction corresponding to the direction in which the handlebar 651 is operated by the rider.

Figure 5:
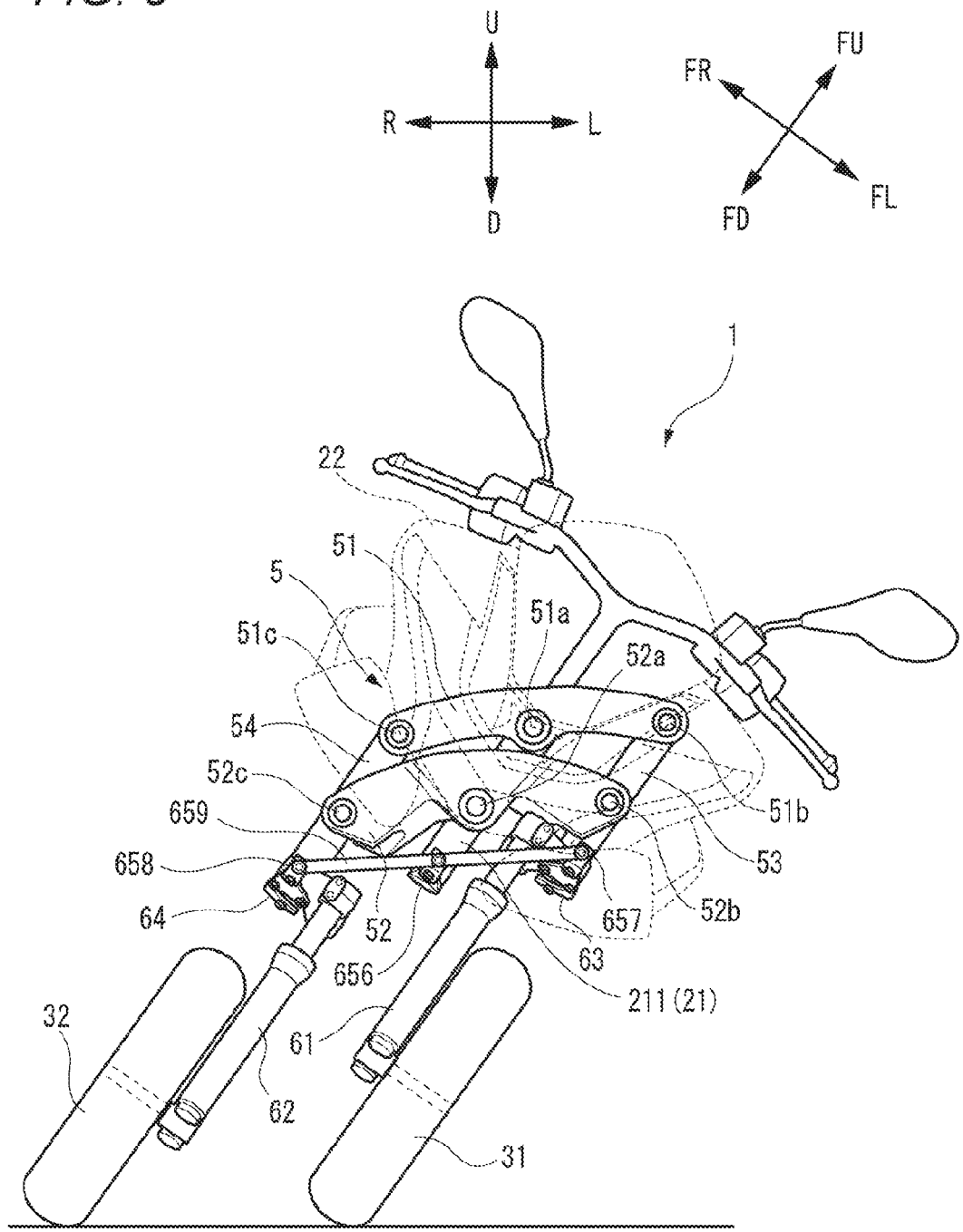
FIG. 5 is a front view showing the front portion of the vehicle shown in FIG. 1 when the vehicle is caused to lean.

Next, referring to FIGS. 2 and 5, a leaning operation of the vehicle 1 will be described. FIG. 5 is a front view of the front portion of the vehicle 1 as viewed from the front in the front-to-rear direction of the body frame 21 with the body frame 21 leaning to the left of the vehicle 1. In FIG. 5, the vehicle 1 is depicted as seen through the body cover 22 which is indicated by broken lines.

As shown in FIG. 2, when looking at the vehicle 1 from the front of the body frame 21 with the body frame 21 in an upright state, the linkage 5 preferably has a rectangular or substantially rectangular shape, for example. As shown in FIG. 5, when looking at the vehicle 1 from the front of the body frame 21 with the body frame 21 leaning, the linkage 5 preferably has a parallelogram or substantially parallelogram shape, for example. The operation of the linkage 5 is interlocked with the leaning of the body frame 21 in the left-to-right direction. The operation of the linkage 5 means that the upper cross member 51, the lower cross member 52, the left side member 53 and the right side member 54 which define the linkage 5 turn relatively about turning axes which pass through the corresponding support portions 51a, 51b, 51c, 52a, 52b, 52c, such that the shape of the linkage 5 changes.

For example, as shown in FIG. 5, when the rider causes the vehicle 1 to lean to the left, the headstock 211 leans to the left from the vertical direction. When the headstock 211 leans, the upper cross member 51 turns about the middle upper axis which passes through the support portion 51a counterclockwise when viewed from the front of the vehicle 1 relative to the headstock 211. Similarly, the lower cross member 52 turns about the middle lower axis which passes through the support portion 52a counterclockwise when viewed from the front of the vehicle 1 relative to the headstock 211. This causes the upper cross member 51 to move to the left in the left-to-right direction of the body frame 21 relative to the lower cross member 52.

When the upper cross member 51 moves in this way, the upper cross member 51 turns counterclockwise when viewed from the front of the vehicle 1 about the left upper axis that passes through the support portion 51b and the right upper axis that passes through the support portion 51c relative to the left side member 53 and the right side member 54, respectively. Similarly, the lower cross member 52 turns counterclockwise when viewed from the front of the vehicle 1 about the left lower axis which passes through the support portion 52b and the right lower axis which passes through the support portion 52c relative to the left side member 53 and the right side member 54, respectively. This causes the left side member 53 and the right side member 54 to lean to the left of the vehicle 1 from the vertical direction while holding their postures parallel to the headstock 211.

As this occurs, the lower cross member 52 moves to the left in the left-to-right direction of the body frame 21 relative to the tie-rod 659. As the lower cross member 52 moves to the left, the shaft portions which are provided at the front portions of the middle joint 656, the left joint 657 and the right joint 658 turn relative to the tie-rod 659. This allows the tie-rod 659 to hold a parallel posture to the upper cross member 51 and the lower cross member 52.

As the left side member 53 leans to the left of the vehicle 1, the left bracket 63 that is supported on the left side member 53 via the left turning member leans to the left of the vehicle 1. In association with the leftward leaning of the left bracket 63, the left shock absorber 61 that is supported on the left bracket 63 also leans to the left of the vehicle 1. As the left shock absorber 61 leans to the left of the vehicle 1, the left front wheel 31 supported on the left shock absorber 61 leans to the left of the vehicle 1 while holding its posture that is parallel to the headstock 211.

As the right side member 54 leans to the left of the vehicle 1, the right bracket 64 that is supported on the right side member 54 via the right turning member leans to the left of the vehicle 1. In association with the leftward leaning of the right side member 54, the right shock absorber 62 that is supported on the right bracket 64 also leans to the left of the vehicle 1. As the right shock absorber 64 leans to the left of the vehicle 1, the right front wheel 32 supported on the right shock absorber 62 leans to the left of the vehicle 1 while holding its posture that is parallel to the headstock 211.

The description of the leaning operation of the left front wheel 31 and the right front wheel 32 is based on the vertical direction. However, when the vehicle 1 leans (when the linkage 5 is actuated to operate), the up-to-down direction of the body frame 21 does not coincide with the vertical direction. In the event that this being described based on the up-to-down direction of the body frame 21, when the linkage 5 is actuated to operate, the left front wheel 31 and the right front wheel 32 change their relative position in the up-to-down direction of the body frame 21. In other words, the linkage 5 changes the relative position of the left front wheel 31 and the right front wheel 32 in the up-to-down direction of the body frame 21 to cause the body frame 21 to lean to the left or right of the vehicle 1 from the vertical direction.

When the rider causes the vehicle 1 to lean to the right, the elements lean to the right. Since the elements move the other way around in relation to the left-to-right direction, the detailed description thereof will be omitted here.

Figure 6:
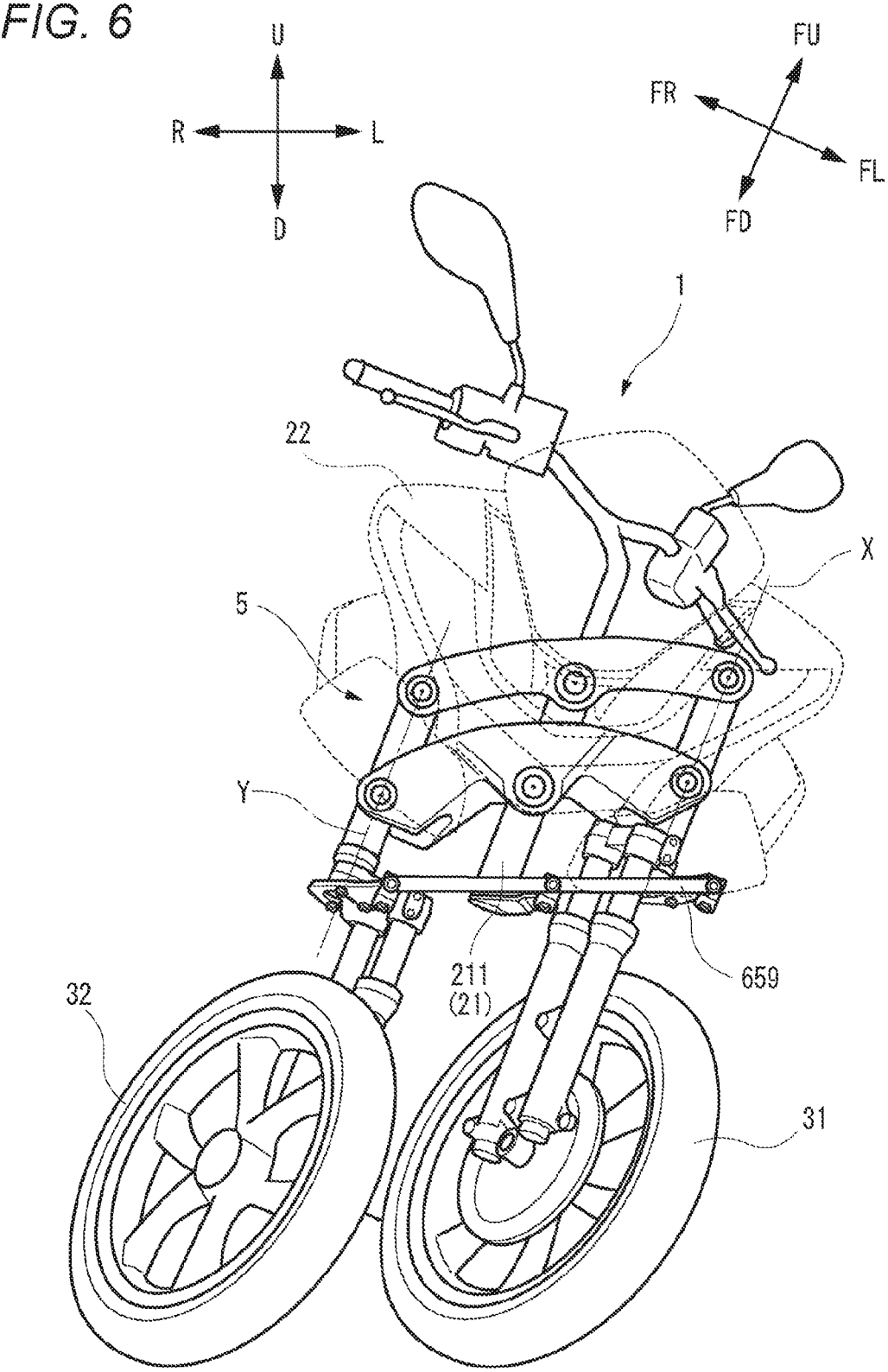
FIG. 6 is a front view showing the front portion of the vehicle shown in FIG. 1 when the vehicle is caused to lean and is steered.

FIG. 6 is a front view of the front portion of the vehicle 1 as viewed from the front in the front-to-rear direction of the body frame 21 with the vehicle 1 caused to lean and turn. FIG. 6 shows a state in which the vehicle 1 is turned to the left while the vehicle 1 leaning to the left. In FIG. 6, the vehicle 1 is depicted as seen through the body cover 22 which is indicated by broken lines.

When a steering operation is performed, the left front wheel 31 is turned counterclockwise about the left steering axis X, while the right front wheel 32 is turned counterclockwise about the right steering axis Y. When a leaning operation is performed, the left front wheel 31 and the right front wheel 32 lean to the left of the vehicle 1 together with the body frame 21. Namely, in this state, the linkage 5 exhibits a parallelogram or substantially parallelogram shape. The tie-rod 659 moves to the left in the left-to-right direction of the body frame 21 and to the rear in the front-to-rear direction of the body frame 21 from the position where the body frame 21 is in the upright state.

Next, portions of the body frame 21 which connect the linkage 5 and the power unit 24 will be described in detail by the use of FIGS. 7, 8 and 9.

Figure 7:
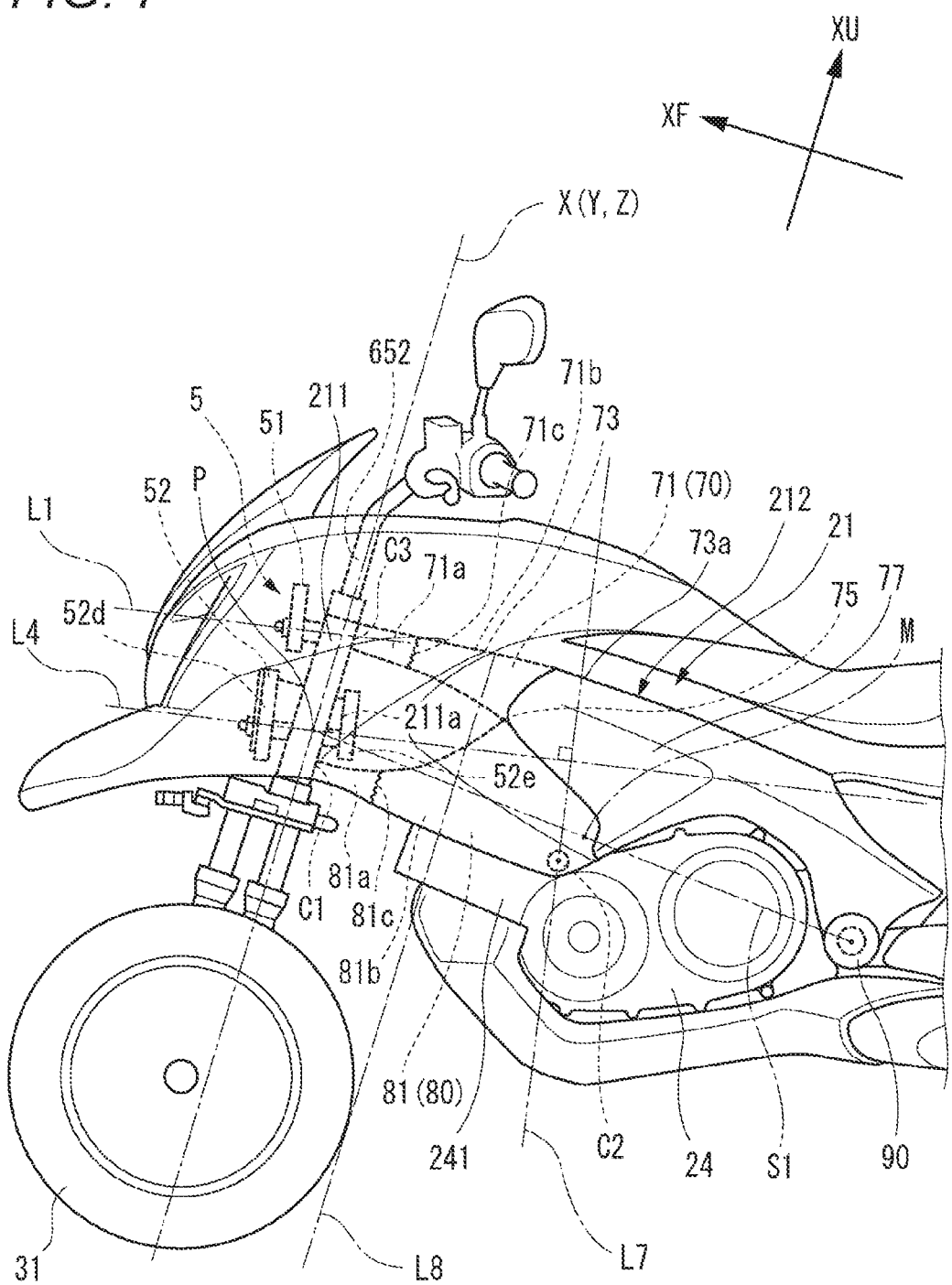
FIG. 7 is a side view showing a body frame at the front portion of the vehicle.

FIG. 7 is a side view showing the body frame 21 at the front portion of the vehicle. FIG. 8 is a front view showing the linkage 5, an upper frame 70 and a portion of a lower frame 80. FIG. 9 is a top view showing the linkage 5 and the upper frame 70.

In FIG. 7, an arrow XU denotes an upward direction in the direction of the left steering axis X. The direction of the left steering axis X is inclined relative to the vertical direction so that an upper portion thereof is positioned behind a lower portion thereof. When looking at the vehicle 1 from the front thereof, the up-to-down direction of the body frame 21 coincides with the direction of the left steering axis X.

Additionally, an arrow XF denotes the front in the direction of the middle lower axis L4. The direction of the middle lower axis L4 is inclined relative to the horizontal direction so that a front portion thereof is positioned above a rear portion thereof.

As shown in FIG. 7, the power unit 24 is connected to the body frame 21. A front portion of the power unit 24 and a rear portion of the power unit 24 are supported on the body frame 21. The rear portion of the power unit 24 is supported on the body frame 21 at the rear wheel swing shaft 90. The rear wheel swing shaft 90 supports the rear arm 213 so as to allow the rear arm 213 to turn about an axis that extends in the left-to-right direction of the body frame 21. The rear wheel 4 is allowed to swing about the rear wheel swing shaft 90 via the rear arm 213. In this preferred embodiment, the main frame 212, the power unit 24 and the rear arm 213 are fastened together by the rear wheel swing shaft 90.

When the vehicle 1 in the upright state is seen from the side thereof, the power unit 24 is provided in a position where at least a portion of the power unit 24 overlaps a line S1 which connects a point of intersection P of the middle lower axis L4 and the left turning axis X and the rear wheel swing shaft 90. In an illustrated example, a portion of the rear portion of the power unit 24 overlaps the line S1. The power unit 24 is provided at a lower portion that results when the vehicle 1 is divided into an upper portion and the lower portion in the up-to-down direction of the body frame 21.

The body frame 21 connects at least the linkage 5 and the rear wheel swing shaft 90. The body frame 21 includes the headstock 211, the lower frame 80, the upper frame 70 and a rear frame 77. In the vehicle 1 according to the present preferred embodiment, the main frame 212 includes the lower frame 80 and the upper frame 70 and the rear frame 77.

The headstock 211 extends in the direction of the left steering axis X. The headstock 211 is inclined from the vertical direction so that the upper portion thereof is positioned behind the lower portion thereof in relation to the direction of the middle lower axis L4.

The headstock 211 is a hollow member. The steering shaft 652 is inserted through an interior of the headstock 211 so as to turn therein. The headstock 211 supports a middle portion of the upper cross member 51 and a middle portion of the lower cross member 52 so as to allow them to turn above the right front wheel 32 and the left front wheel 31 in relation to the direction of the left steering axis X.

The lower frame 80 defines a portion of the body frame 21 that extends from a connecting portion C1 to a connecting portion C2, both of which will be described below. The upper frame 70 defines a portion of the body frame 21 that extends from a connecting portion C3, which will be described below, to the same position as the connecting portion C2 in relation to the direction of the middle upper axis L1. The rear frame 77 defines a portion of the body frame 21 that extends from the connecting portion C2 to the rear wheel swing shaft 90 in relation to the direction of the middle lower axis L4. The rear frame 77 supports the power unit 24 and the rear wheel swing shaft 90. The upper frame 70 and the lower frame 80 will be described in detail below.

The lower frame 80 is a portion of the body frame 21 that connects the headstock 211 and the power unit 24 together. The lower frame 80 extends in the front-to-rear direction of the vehicle 1. The lower frame 80 preferably has a symmetrical shape in relation to the left-to-right direction of the vehicle 1.

The lower frame 80 is connected to the headstock 211 at the connecting portion C1. The lower frame 80 is connected to the power unit 24 at the connecting portion C2. The connecting portion C1 of the lower frame 80 and the headstock 211 is positioned below the lower cross member 52 in the direction of the left steering axis X. The connecting portion C2 of the lower frame 80 and the power unit 24 is positioned at an upper portion of the power unit 24 when the vehicle 1 is seen from the side thereof.

The lower frame 80 is a portion of the body frame 21 and extends from the headstock 211 to the rear below the middle lower axis L4 in relation to the direction of the left steering axis X. The lower frame 80 defines a portion of the body frame 21 that extends from the connecting portion C1 to the connecting portion C2. The lower frame 80 defines a portion of the body frame 21 that extends from the headstock 211 to a connecting portion of the body frame 21 that is situated ahead of the rear wheel swing shaft 90 in relation to the direction of the middle lower axis L4 and the power unit 24.

In the illustrated example, the lower frame 80 is integral with the rear frame 77. A portion of the body frame 21 that connects the power unit 24 and the rear wheel swing shaft 90 together is integral with the lower frame 80. The lower frame 80 is integral with a portion of the body frame 21 that extends from the connecting portion C2 to the rear wheel swing shaft 90. A portion of the body frame 21 that extends from the connecting portion C2 of the power unit 24 and the body frame 21 that is positioned ahead of the rear wheel swing shaft 90 in relation to the front-to-rear direction of the middle lower axis L4 to the rear wheel swing shaft 90 is integral with the lower frame 80. When the vehicle 1 in the upright state is seen from the side thereof, the lower frame 80 is provided above the power unit 24 in the up-to-down direction of the vehicle 1.

In the illustrated example, the connecting portion C2 of the lower frame 80 and the power unit 24 is positioned ahead of a middle point M of the line S1 that connects a point of intersection P of the middle lower axis L4 and the left steering axis X and the rear wheel swing shaft 90 in relation to the direction of the middle lower axis L4.

The upper frame 70 is positioned above the lower frame 80 in the direction of the left steering axis X. The upper frame 70 extends in the front-to-rear direction of the vehicle 1. The upper frame 70 preferably has a symmetrical shape in relation to the left-to-right direction of the vehicle 1.

A connecting portion C3 of the upper frame 70 and the headstock 211 is positioned above the connecting portion C1 of lower frame 80 and the headstock 211 in the direction of the left steering axis X. The upper frame 70 extends rearwards in the direction of the middle lower axis L4 from the connecting portion C3 to at least a position lying directly above the connecting portion C2 of the lower frame 80 with the power unit 24. The upper frame 70 defines a portion of the body frame 21 that extends from the connecting portion C3 to the same position as the connecting portion C2 in relation to the direction of the middle upper axis L1. The upper frame 70 defines a portion of the body frame 21 that extends from the connecting portion C3 to the same position as the connecting portion C2 of the body frame 21 that is provided ahead of the rear wheel swing shaft 90 in relation to the direction of the middle upper axis L1 and the power unit 24.

In the illustrated example, the upper frame 70 is integral with the rear frame 77. A portion extending from a rear portion of the upper frame 70 to a connecting portion of the body frame 21 with the rear wheel swing shaft 90 is integral with the upper frame 70. A portion extending from the same position as the connecting portion C2 in relation to the direction of the middle upper axis L1 to the rear wheel swing shaft 90 is integral with the upper frame 70. A portion extending from the connecting portion C2 of the body frame 21 with the power unit 24 that is positioned ahead of the rear wheel swing shaft 90 in relation to the direction of the middle lower axis L4 to the rear wheel swing shaft 90 is integral with the upper frame 70.

Figure 8:
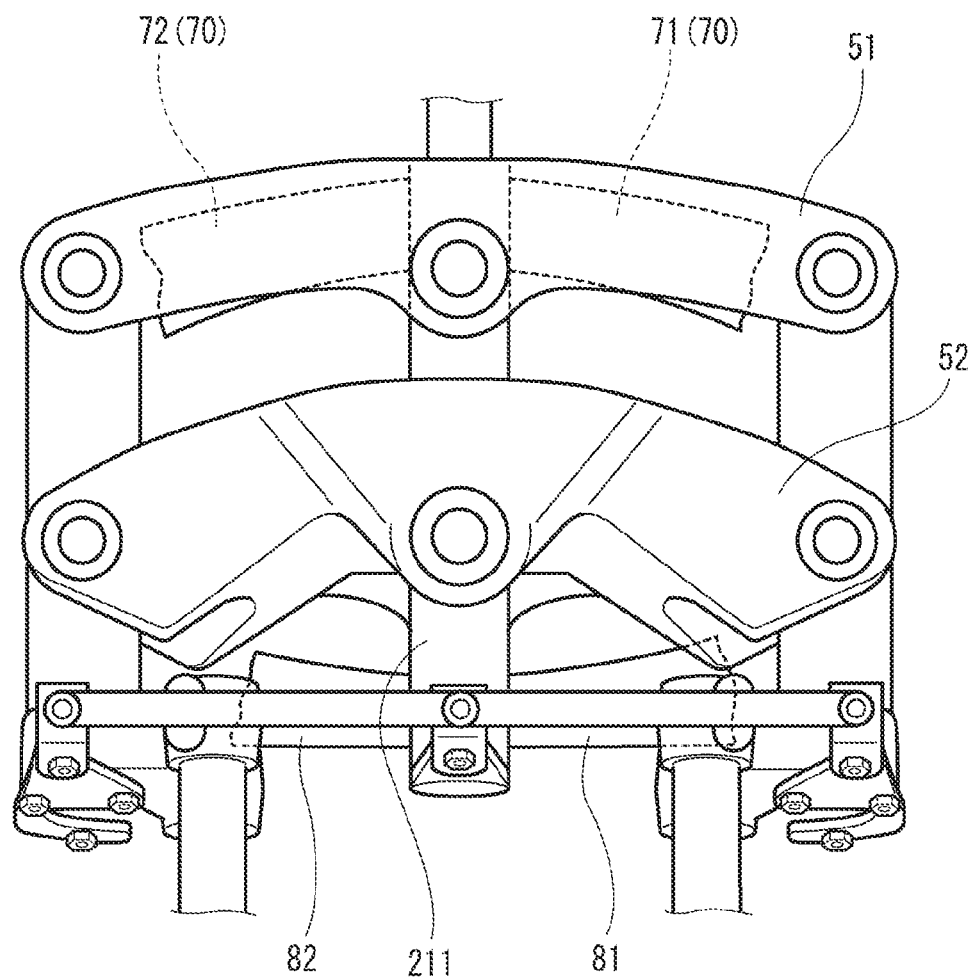
FIG. 8 is a front view showing a linkage, an upper frame and a portion of a lower frame.

As shown in FIGS. 7 and 8, the upper frame 70 is provided so that at least a portion of the upper frame 70 overlaps the upper cross member 51 when seen from the front of the middle upper axis L1. The portion of the upper frame 70 that overlaps the upper cross member 51 extends generally along the middle upper axis L1.

When the vehicle 1 in the upright state is seen from the side thereof, a point of intersection 73a of a straight line L7 that passes the connecting portion C2 of the lower frame 80 with the power unit 24 and intersects the middle lower axis L4 at right angles and an upper edge 73 of the upper frame 70 is positioned above the point of intersection P of the middle lower axis L4 and the left steering axis X in relation to the direction of the left steering axis X.

In the illustrated example, when the vehicle 1 in the upright state is seen from the side thereof, the entire upper edge 73 of the upper frame 70 is positioned above the line S1 which connects the point of intersection P of the middle lower axis L4 and the left steering axis X and the rear wheel swing shaft 90 in relation to the direction of the left steering axis X. In the illustrated example, the upper edge 73 of the upper frame 70 continues to an upper edge of the rear frame 77. The whole of the upper edge 73 of the upper frame 70 and the entire upper edge of the rear frame 77 are positioned above the line S1.

The lower frame 80 and the upper frame 70 are connected together via a connecting portion 75. The connecting portion 75 is provided between the connecting portion C1 of the lower frame 80 with the headstock 211 and the connecting portion C2 of the lower frame 80 with the power unit 24 when the vehicle 1 in the upright state is seen from the side thereof. The lower frame 80 and the upper frame 70 are integral with each other behind the connecting portion 75 in the direction of the middle lower axis L4.

In the illustrated example, the portion of the body frame 21 that is positioned behind the straight line L7 that passes the connecting portion C2 of the power unit 24 with the lower frame 80 and intersects the middle lower axis L4 at right angles in relation to the direction of the middle lower axis L4 defines the rear frame 77.

A portion of the body frame 21 that is positioned ahead and above a middle point between the upper edge 73 of the upper frame 70 and a lower edge of the lower frame 80 on the straight line L7 defines the upper frame 70.

A portion of the body frame 21 that is positioned ahead and below the middle point between the upper edge 73 of the upper frame 70 and the lower edge of the lower frame 80 on the straight line L7 defines the lower frame 80.

Figure 9:
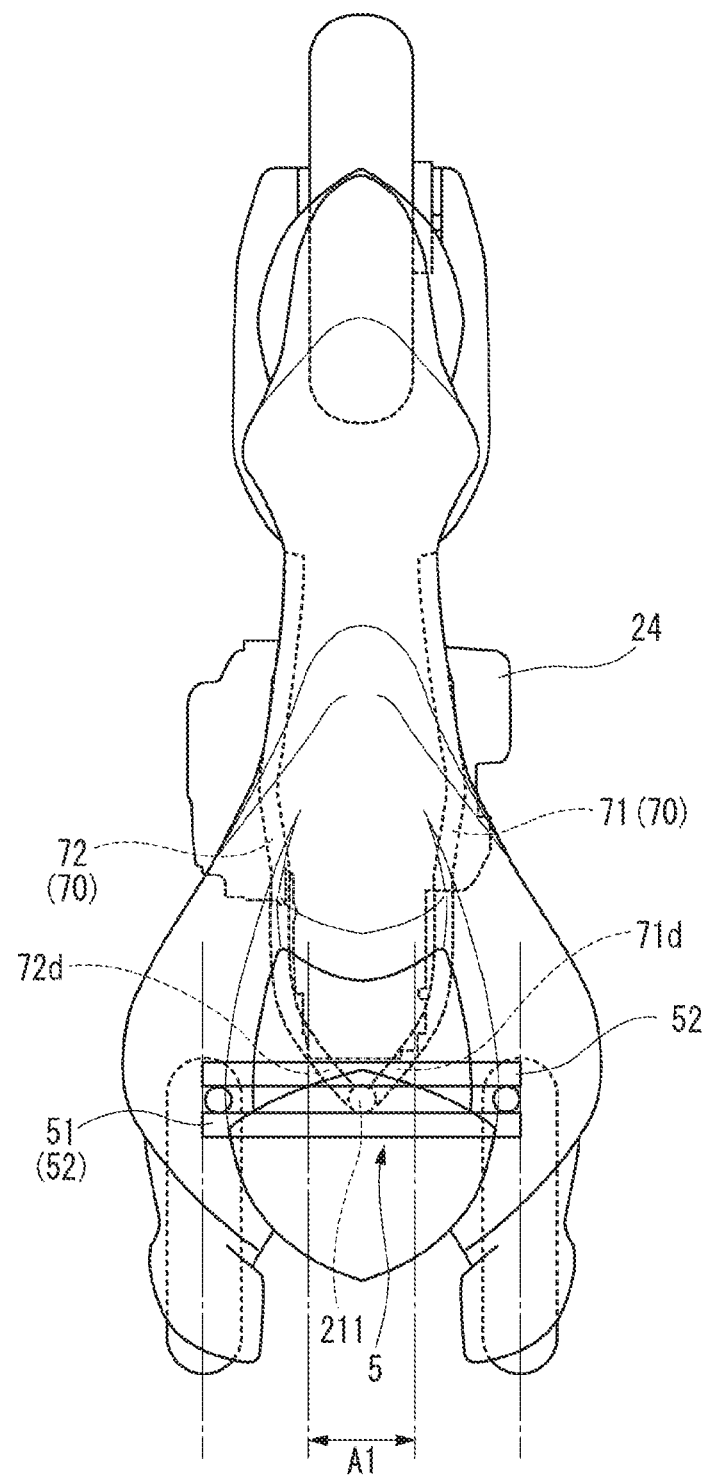
FIG. 9 is a top view showing the linkage and the upper frame.

As shown in FIG. 9, the upper frame 70 includes an upper right frame 72 and an upper left frame 71. The upper left frame 71 is positioned on the left of the upper right frame 72 in relation to the left-to-right direction of the vehicle 1.

The upper right frame 72 is connected to a right portion of the headstock 211 and is connected to a right portion of the power unit 24. The upper right frame 72 extends from the headstock 211 obliquely rightwards and rearwards towards the power unit 24.

The upper left frame 71 is connected to a left portion of the headstock 211 and is connected to a left portion of the power unit 24. The upper left frame 71 extends from the headstock 211 obliquely leftwards and rearwards towards the power unit 24.

The lower frame 80 also includes a lower right frame 82 and a lower left frame 81 (refer to FIG. 8). The shapes of the lower right frame 82 and the lower left frame 81 when viewed from above are similar to the upper right frame 72 and the upper left frame 71, respectively. In a top view shown in FIG. 9, the lower right frame 82 and the lower left frame 81 overlap the upper right frame 72 and the upper left frame 71, respectively.

As shown in FIG. 7, the upper left frame 71 and the lower left frame 81 are integral with each other via the connecting portion 75 behind a rear end of the linkage 5 in relation to the direction of the middle lower axis L4. In the illustrated example, the rear end of the linkage 5 is a rear end of the lower cross member 52. Although not shown, the upper right frame 72 and the lower right frame 82 are also integral with each other behind the rear end of the linkage 5.

As shown in FIG. 9, when the vehicle 1 is seen from above, the portions of the upper right frame 72 and the upper left frame 71 that overlap the lower cross member 52 are positioned in a central portion A1 when the lower cross member 52 is divided into three in the left-to-right direction. In the illustrated example, a front portion 72d of the upper right frame 72 and a front portion 71d of the upper left frame 71 overlap the lower cross member 52, and the lower cross member 52 is positioned in a central portion A1 resulting when the lower cross member 52 is divided into three in the left-to-right direction of the vehicle 1.

Although not shown, in this preferred embodiment, as to the lower frame 80, too, when the vehicle 1 is seen from above, the portions of the lower right frame 82 and the lower left frame 81 that overlap the lower cross member 52 are positioned in the central portion A1 resulting when the lower cross member 52 is divided into three in the left-to-right direction.

The inventor studied the loads that act on the link support of the body frame 21 that supports the linkage 5 before conceiving of and developing the structure of the body frame 21 as described above. In the vehicle 1 according to the present preferred embodiment, the headstock 211 corresponds to the link support.

The middle portion of the upper cross member 51 in the left-to-right direction is supported by the link support. The middle portion of the lower cross member 52 in the left-to-right direction is supported on the link support below the upper cross member 51. The middle portion of the lower cross member 52 in the left-to-right direction is supported on the link support above upper ends of the left and right front wheels 3.

In the vehicle 1 including the body frame 21 that leans and the two front wheels 3, various situations are thought of where a large magnitude of load acts on the link support.

For example, a situation is thought of where a braking force of a certain magnitude is applied equally to both of the right front wheel 32 and the left front wheel 31. When the braking force is applied to the right front wheel 32 and the left front wheel 31, a rearward load acts on the right front wheel 32 and the left front wheel 31.

The force that has acted on the right front wheel 32 is transmitted to the right side member 54 of the linkage 5 via the right shock absorber 62. Further, the force that has acted on the right side member 54 is transmitted to the right portion of the upper cross member 51 and the right portion of the lower cross member 52 that are connected to the right side member 54. Further, the force that has acted on the right portion of the upper cross member 51 is transmitted to the link support that supports the upper cross member 51. In addition, the force that has acted on the right portion of the lower cross member 52 is transmitted to the link support that supports the lower cross member 52.

Similarly, the force that has acted on the left front wheel 31 is transmitted to the left side member 53 of the linkage 5 via the left shock absorber 61. Further, the force that has acted on the left side member 53 is transmitted to the left portion of the upper cross member 51 and the left portion of the lower cross member 52 that are connected to the left side member 53. Further, the force that has acted on the left portion of the upper cross member 51 is transmitted to the link support that supports the upper cross member 51. In addition, the force that has acted on the left portion of the lower cross member 52 is transmitted to the link support that supports the lower cross member 52.

As a different example, a situation is thought of where the right front wheel 32 runs on a flat road surface, while the left front wheel 31 is riding over a bump. When the right front wheel 32 runs on the flat road surface, while the left front wheel 31 is riding over the bump, a rearward pushing force acts only on the left front wheel 31 as a result of the left front wheel 31 riding over the bump. Then, the force that has acted on the left front wheel 31 is transmitted to the left side member 53 of the linkage 5 via the left shock absorber 61. Further, the force that has acted on the left side member 53 is transmitted to the left portions of the upper cross member 51 and the lower cross member 52 that are connected to the left side member 53. Further, the force that has acted on the left portion of the upper cross member 51 is transmitted to the link support that supports the upper cross member 51. In addition, the force that has acted on the left portion of the lower cross member 52 is transmitted to the link support that supports the lower cross member 52.

The body frame 21 that includes the link support preferably has sufficient rigidity to bear these forces.

As a result of having thought of the various situations where the loads acts on the link support, the inventor discovered that most of the loads that act on the link support is transmitted from the left portion and/or the right portion of the upper cross member 51 and the left portion and/or the right portion of the lower cross member 52.

Then, to ensure the rigidity of the link support while preventing the enlargement in size of the vehicle 1, the magnitudes of the force that is transmitted from the upper cross member 51 to the link support and the force that is transmitted from the lower cross member 52 to the link support were analyzed. As a result, having discovered the tendency that the force that is transmitted from the lower cross member 52 to the link support is greater than the force that is transmitted from the upper cross portion 51 to the link support and the tendency that as to components of the force transmitted to the link support, a component transmitted from the front-to-rear direction is greater than components transmitted from the up-to-down and left-to-right directions, the inventor conceived the present invention.

As described above, as to the loads acting on the link support, the inventor discovered that the load transmitted from the lower cross member 52 tends to be greater than the load transmitted from the upper cross member 51. Because of this, of the upper frame 70 and the lower frame 80 that support the link support, the inventor studied a method to enhance the rigidity of the lower frame 80.

Then, in the vehicle 1 according to a preferred embodiment of the present invention, when the vehicle 1 in the upright state is seen from the side thereof, the lower frame 80 connects the power unit 24 which is provided in the position where at least a portion of the power unit 24 overlaps the line S1 which connects the point of intersection P of the middle lower axis L4 and the left steering axis X and the rear wheel swing shaft 90 and the link support (the headstock 211). Namely, the power unit 24 having a high rigidity is positioned between the linkage 5 and the rear wheel swing shaft 90, and the power unit 24 is connected to the lower frame 80. The support portion where the power unit 24 is supported is provided on the lower frame 80. The lower frame 80 may support the power unit 24 via a member such as a bracket.

As in the vehicle according to International Patent Publication No. 2014/098228 which is different from the vehicle 1 according to preferred embodiments of the present invention, in the event that the power unit 24 is provided behind the rear wheel swing shaft 90, the power unit 24 which is a rigid body is not present between the linkage 5 and the rear wheel swing shaft 90. In addition, in the vehicle described above, a highly rigid member like the power unit 24 is not provided between the linkage 5 and the rear wheel swing shaft 90, and hence, it is difficult to enhance the rigidity of the body frame 21 which connects the linkage 5 and the rear wheel swing shaft 90. Then, in order to ensure the rigidity required of the body frame 21, the diameter of the body frame 21 is increased, and further, interference of the body frame 21 with other members is avoided, as a result of which the body frame 21 tends to be enlarged in size.

However, according to preferred embodiments of the present invention, the power unit 24 which is a rigid body is disposed between the linkage 5 and the rear wheel swing shaft 90, and the lower frame 80 is connected to the linkage 5 and the power unit 24. Because of this, the rigidity of the lower frame 80 which connects the linkage 5 and the power unit 24 is easily enhanced by using the power unit 24 which is a rigid body. Because of this, the lower frame 80 is easy to be made small in size while ensuring the required rigidity.

In addition, the power unit 24 which is a rigid body supports the lower frame 80 strongly and rigidly, and therefore, the lower frame 80 supports the link support with high rigidity. This obviates the necessity of increasing the diameter of the lower frame 80 in order to enhance the rigidity thereof, and hence, it is possible to prevent the lower frame 80 from interfering with the lower cross member, the right front wheel, the left front wheel, the right shock absorber, the left shock absorber and the steering mechanism. In this way, the inventor discovered that the required rigidity is ensured without enlarging the lower frame 80 in size.

When the loads act on the link support, a compression load, a tensile load and a bending load act on the upper frame 70 and the lower frame 80. Among these loads, the dominant load is the bending load in considering the rigidity required of the upper frame 70 and the lower frame 80.

In the event that the bending load acting on the lower frame 80 from the link support, the bending moment acts on the lower frame 80 in such a way that the connecting portion C1 of the lower frame 80 with the link support defines a point of action and the connecting portion C2 of the lower frame 80 with the power unit 24 defines a fulcrum. As described above, the distance between the linkage 5 and the power unit 24 is short, and therefore, the bending moment acting on the lower frame 80 becomes small, such that the rigidity required of the lower frame 80 is reduced.

According to the present preferred embodiment, when the vehicle 1 in the upright state is seen from the side thereof, in the position that passes through the connecting portion C2 of the lower frame 80 with the power unit 24, the upper edge 73 of the upper frame 70 is positioned above the point of intersection P of the middle lower axis L4 and the left steering axis X in relation to the up-to-down direction L7 which intersects the middle lower axis L4 at right angles. Namely, the upper frame 70 easily follows the front-to-rear direction by disposing the upper edge 73 of the upper frame 70 at a high position. According to this structure, when the load acts on the upper frame 70 in the front-to-rear direction, it is easy to make a component of the load that acts in an extending or contracting direction greater than a bending component thereof, such that it becomes easy to reduce the rigidity required of the upper frame 70.

For the reasons described above, it becomes easy to reduce the diameters of the upper frame 70 and the lower frame 80 while ensuring the required rigidity, such that the body frame 21 is prevented from being enlarged in size. Additionally, the body frame 21 is not enlarged in size, and therefore, it is easy to avoid interference of the lower cross member 52, the right front wheel 32, the left front wheel 31, the right shock absorber 62, the left shock absorber 61 and the steering mechanism 6 with the upper frame 70 and the lower frame 80, such that the entire vehicle 1 is also prevented or reduced from being enlarged in size.

In the vehicle 1 described above, as shown in FIG. 7, the upper frame 70 and the lower frame 80 are connected together via the connecting portion 75 that is provided between the connecting portion C1 of the lower frame 80 with the headstock 211 and the connecting portion C2 of the lower frame 80 with the power unit 24 when the vehicle 1 in the upright state is seen from the side thereof.

Namely, the connecting portion 75 which connects the upper frame 70 and the lower frame 80 is provided between the connecting portion C1 and the connecting portion C2. This allows the upper frame 70 to bear a portion of the bending load acting on the lower frame 80 via the connecting portion 75, and therefore, the rigidity required of the lower frame 80 is reduced.

In the vehicle 1 described above, the lower frame 80 is connected to the link support (the headstock 211) below the lower cross member 52 in relation to the direction of the left steering axis X as shown in FIG. 7, and at least a portion of the upper frame 70 is provided in the position where it overlaps the upper cross member 51 when seen from the front of the middle upper axis L1 as shown in FIG. 8.

The load acting on the link support from the upper cross member 51 acts along the middle upper axis L1. According to the vehicle 1 of this preferred embodiment, the direction in which the upper frame 70 extends easily coincides with the direction of the force that acts on the link support in the front-to-rear direction from the upper cross member 51, such that the bending moment acting on the upper frame 70 is easily further reduced. This makes it easy for the upper frame 70 to be reduced in diameter further, such that it is easy to avoid interference with the upper cross member 51 and the lower cross member 52.

In the vehicle 1 according to the present preferred embodiment, similar to the upper frame 70 shown in FIG. 9, the lower frame 80 includes the lower right frame 82 and the lower left frame 81 which is provided on the left of the lower right frame 82 in relation to the left-to-right direction of the vehicle 1, and the lower right frame 82 is fixed to a right portion of the power unit 24, while the lower left frame 81 is fixed to a left portion of the power unit 24.

In the event that the lower right frame 82 is fixed to the right portion of the power unit 24, when the vehicle 1 is seen from above, the lower right frame 82 is easily disposed in such a way as to extend obliquely rightwards and rearwards from the link support towards the power unit 24.

In the event that the lower left frame 81 is fixed to the left portion of the power unit 24, when the vehicle 1 is seen from above, the lower left frame 81 is easily disposed in such a way as to extend obliquely leftwards and rearwards from the link support towards the power unit 24.

Because of this, in the event that a component in the left-to-right direction of the load transmitted to the link support is great, the force in the left-to-right direction acts on the lower right frame 82 and the lower left frame 81 as a compression force or a tensile force, reducing a bending component. Namely, when the load acts on the lower right frame 82 and the lower left frame 81, it is easy to make the component of the load that acts in the extending or contracting direction greater than the bending component thereof, such that it becomes easy to reduce the rigidity required of the lower right frame 82 and the lower left frame 81. Because of this, the body frame 21 is easy to be made small in size while ensuring the rigidity required of the lower right frame 82 and the lower left frame 81.

In the vehicle 1 shown in FIG. 7, when the vehicle 1 in the upright state is seen from the side thereof, the upper edge 73 of the upper frame 70 is positioned above the line S1 which connects the point of intersection P of the middle lower axis L4 and the left steering axis X and the rear wheel swing shaft 90 in relation to the direction of the left steering axis X.

The orientation of the portion of the upper frame 70 that extends rearwards from the headstock 211 is easier to be made to follow the middle upper axis L1 by disposing the entire upper edge 73 of the upper frame 70 at a high position. According to this structure, when the load acts on the upper frame 70 in the front-to-rear direction, it is easy to make a component of the load that acts in an extending or contracting direction greater than a bending component thereof, such that it becomes easy to reduce the rigidity required of the upper frame 70.

In the vehicle 1 shown in FIG. 7, the upper frame 70 includes the upper right frame 72 and the upper left frame 71 that is provided on the left of the upper right frame 72 in relation to the left-to-right direction of the vehicle 1, the lower frame 80 includes the lower right frame 82 and the lower left frame 81 that is provided on the left of the lower right frame 82 in relation to the left-to-right direction of the vehicle 1, the upper right frame 72 and the lower right frame 82 become integral behind the rear end of the linkage 5 in relation to the direction of the middle lower axis L4, and the upper left frame 71 and the lower left frame 81 become integral behind the rear end of the linkage 5 in relation to the direction of the middle lower axis L4.

The upper right frame 72 and the lower right frame 82 are integral, and therefore, the upper right frame 72 bears a portion of a load acting on the lower right frame 82, and the lower right frame 82 bears a portion of a load acting on the upper right frame 72.

The upper left frame 71 and the lower left frame 81 are integral, and therefore, the upper left frame 71 bears a portion of a load acting on the lower left frame 81, and the lower left frame 81 bears a portion of a load acting on the upper left frame 71.

This reduces the rigidity required of the upper frame 70.

In the vehicle 1 shown in FIG. 9, the upper frame 70 includes the upper right frame 72 and the upper left frame 71 that is provided on the left of the upper right frame 72 in relation to the left-to-right direction of the vehicle 1, the lower frame 80 includes the lower right frame 82 and the lower left frame 81 that is provided on the left of the lower right frame 82 in relation to the left-to-right direction of the vehicle 1, and when the vehicle 1 is seen from above, portions 72d, 71d of the upper right frame 72, the upper left frame 71, the lower right frame 82 and the lower left frame 81 that overlap the lower cross member 52 are positioned at the central portion A1 resulting when the lower cross member 52 is divided into three in the left-to-right direction.

The lower cross member 52 turns about the middle lower axis L4. Because of this, even when the linkage 5 is actuated to operate, the central portion of the lower cross member 52 in the left-to-right direction is displaced less than the left portion and the right portion thereof. Because of this, interference of the upper right frame 72, the upper left frame 71, the lower right frame 82 and the lower left frame 81 with the lower cross member 52 is easily avoided, and hence, the upper right frame 72, the upper left frame 71, the lower right frame 82 and the lower left frame 81 are easily disposed near the lower cross member 52. This prevents easily the enlargement in size of the vehicle 1.

As shown in FIG. 7, when the vehicle 1 in the upright state is seen from the side thereof, the lower left frame 81 includes a portion that is positioned below the middle lower axis L4 in relation to the direction of the left steering axis X ahead of a rear edge L8 of a movable range of the left front wheel 31 in relation to the direction of the middle lower axis L4.

In FIG. 7, the straight line L8 denotes a straight line which follows the rear edge of the movable range of the left front wheel 31. When the linkage 5 is actuated to be operated without turning the left front wheel 31 about the left steering axis X, the left front wheel 31 moves in a direction which intersects the middle lower axis L4 at right angles. As this occurs, a rear end of the left front wheel 31 moves along the straight line L8. When the left front wheel 31 is turned about the left steering axis X, the rear end of the left front wheel 31 is positioned ahead of the straight line L8.

Although not shown, similarly, when the vehicle 1 in the upright state is seen from the side thereof, the lower right frame includes a portion that is positioned below the middle lower axis L4 in relation to the direction of the left steering axis X ahead of the rear edge of the movable range of the right front wheel 32 in relation to the direction of the middle lower axis L4.

As shown in FIG. 9, when the vehicle 1 is seen from above, the portions of the lower right frame 82 and the lower left frame 81 that overlap the lower cross member 52 that is positioned behind the headstock 211 are positioned in the central portion A1 resulting when the lower cross member 52 is divided into three in the left-to-right direction, and the lower right frame 82 and the lower left frame 81 are made difficult to interfere with the lower cross member 52. In addition, even when the linkage 5 is actuated to operate, causing the right front wheel 32 and the left front wheel 31 to move up and down, the right front wheel 32, the right shock absorber 62, the left front wheel 31 and the left shock absorber 61 are made difficult to enter the central portion A1, compared with the right front wheel 32 and the left front wheel 31 entering the right portion and the left portion when the lower cross member 52 is divided into three in the left-to-right direction. Because of this, even though the lower right frame 82 and the lower left frame 81 are disposed below the lower middle axis L4 in relation to the direction of the left steering axis X, the lower right frame 82 and the lower left frame 81 are made difficult to interfere with the lower cross member 52, the right front wheel 32, the left front wheel 31, the right shock absorber 62 and the left shock absorber 61.

As shown in FIG. 7, when the vehicle 1 in the upright state is seen from the side thereof, the connecting portion C2 of the lower frame 80 with the power unit 24 is positioned ahead of the middle point M of the line S1 that connects the point of intersection P of the middle lower axis L4 and the left steering axis X and the rear wheel swing shaft 90.

The distance between the point of action and the fulcrum of the lower frame 80 when the bending moment acts on the lower frame 80 is easily shortened, such that the bending moment acting is reduced. Because of this, the lower frame 80 is easily made small in size, and interference of the lower frame 80 with the upper cross member 51, the lower cross member 52, the right front wheel 32 and the left front wheel 31 is easily avoided, such that the body frame 21 is prevented from being enlarged in size.

Similar to the upper frame 70 shown in FIG. 9, the lower left frame 81 includes a front lower left frame 81a and a rear lower left frame 81b which are welded together, for example. As shown in FIG. 7, the front lower left frame 81a is positioned ahead of the connecting portion C2 when the vehicle 1 in the upright state is seen from the side thereof. The rear lower left frame 81b is positioned behind a rear end of the front lower left frame 81a and is welded, for example, to the front lower left frame 81a. A weld portion 81c is located on a boundary between the front lower left frame 81a and the rear lower left frame 81b.

Although not shown, similar to the lower left frame 81, the lower right frame 82 also includes a front lower right frame that is positioned ahead of the connecting portion C2 when the vehicle 1 in the upright state is seen from the side thereof and a rear lower right frame that is positioned behind a rear end of the front lower right frame and is welded, for example, to the front lower right frame. A weld portion is located on a boundary between the front lower right frame and the rear lower right frame.

The upper left frame 71 includes a front upper left frame 71a and a rear upper left frame 71b which are welded together. The front upper left frame 71a is positioned ahead of the connecting portion C2 when the vehicle 1 in the upright state is seen from the side thereof. The rear upper left frame 71b is positioned behind a rear end of the front upper left frame 71a and is welded to the front upper left frame 71a. A weld portion 71c is located on a boundary between the front upper left frame 71a and the rear upper left frame 71b.

Although not shown, similar to the upper left frame 71, the upper right frame 72 also includes a front upper right frame that is positioned ahead of the connecting portion C2 when the vehicle 1 in the upright state is seen from the side thereof and a rear upper right frame that is positioned behind a rear end of the front upper right frame and is welded to the front upper right frame. A weld portion is located on a boundary between the front upper right frame and the rear upper right frame.

As shown in FIG. 7, in the vehicle 1 according to this preferred embodiment, the lower cross member 52 includes a front member 52*d* that is positioned ahead of the headstock 211 and a rear member 52*e* that is positioned behind the headstock 211 in relation to the direction of the middle lower axis L4. A rear end surface 211*a* of a projecting portion that extends from the headstock 211 to the rear in relation to the direction of the middle lower axis L4 supports the rear member 52*e*. In order to enhance the accuracy of a turning center of the rear member 52*e*, it is preferable that the machining accuracy of the rear end surface 211*a* of the projecting portion is high.

Then, the upper frame 70 and the lower frame 80 that extend from the headstock 211 to the rear are each preferably divided into two in the front-to-rear direction. To provide this structure, firstly, the front lower left frame 81*a*, the front lower right frame, the front upper left frame 71*a* and the front upper right frame are connected to the headstock 211. Next, a tool is moved towards the headstock 211 from the rear thereof to machine the rear end surface 211*a* of the projecting portion. Thereafter, in the rear lower left frame 81*b*, the rear lower right frame, the rear upper left frame 71*b* and the rear upper right frame, the front lower left frame 81*a* is welded, for example, to the front lower right frame, and the front upper left frame 71*a* is welded, for example, to the front upper right frame.

According to this fabrication method, in machining the rear end surface 211*a* of the projecting portion, the tool easily reaches the rear end surface 211*a* of the projecting portion for easy machining, such that the machining accuracy of the rear end surface 211*a* of the projecting portion is enhanced easily.

Incidentally, as in the vehicle described in PARTS CATALOGUE MW125 2CM1), YAMAHA MOTOR CO. LTD., in the vehicle including the body frame that leans to the two wheels that are aligned side by side in the left-to-right direction, an impact is exerted on each of the right front wheel and the left front wheel, and therefore, in order to support the linkage that supports the right front wheel and the left front wheel, a large supporting rigidity is necessary. Then, in the vehicle described in PARTS CATALOGUE MW125 (2CM1), YAMAHA MOTOR CO. LTD., in order to enhance the supporting rigidity of the link support that supports the linkage, the rigidity of the body frame is enhanced by a single headstock having a large diameter, the down pipe that extends from the lower portion of the headstock to the rear and the gusset that reinforces the connecting portion of the lower portion of the headstock with the down pipe so as to support the linkage.

In the vehicle described in PARTS CATALOGUE MW125 (2CM1), YAMAHA MOTOR CO. LTD., the front lower cross element and the rear lower cross element that make up the lower cross member are provided so as to hold the headstock in relation to the front-to-rear direction.

In attaching the rear lower cross element to the headstock, for example, there may be a situation in which machining is executed so that the flatness of the portion where the rear lower cross element is brought into contact when it turns or that the direction of the flat surface of the portion is corrected. In the vehicle described in PARTS CATALOGUE MW125 (2CM1), YAMAHA MOTOR CO. LTD., the body frame is not provided which extends from the position where the rear lower cross element is attached or the portion on the periphery thereof to the rear. This allows the tool to move towards the attaching portion from the rear for simple machining.

According to this structure, with the linkage supported with high rigidity, the headstock is easily machined after the headstock is attached to the linkage.

Incidentally, the inventor studied the possibility of enhancing the supporting rigidity of the linkage 5 further. Then, as in the preferred embodiments described above, the inventor thought that the load that is transmitted from the linkage 5 to the upper frame 70 via the link support 211 is made to act in the longitudinal direction of the upper frame 70 by positioning the connecting point C3 of the link support 211 (the headstock) with the upper frame 70 below the lower portion of the link support 211. In a long member, a longitudinal rigidity is greater than a rigidity in the direction that is at right angles to the longitudinal direction. Thus, by using this layout, the upper frame 70 supports the linkage 5 with high rigidity.

However, in the event that this layout being used, as shown in FIG. 7, the upper frame 70 and the lower frame 80 come close to the rear member 52*e* of the lower cross member 52. Because of this, it is difficult to move the tool towards the attaching portion of the rear member 52*e* from the rear, and this makes it difficult to machine the attaching portion.

Preferred embodiments of the present invention also provide a vehicle in which a linkage 5 is supported with high rigidity and an element attaching portion of the linkage 5 that is positioned behind a link support 211 is easily machined.

Then, the vehicle 1 according to a preferred embodiment includes a body frame 21 that leans to the right of the vehicle 1 when the vehicle 1 turns right and to the left of the vehicle 1 when the vehicle 1 turns left; a right front wheel 32 and a left front wheel 31 aligned side by side in a left-to-right direction of the body frame 21; a rear wheel 4 disposed behind the right front wheel 32 and the left front wheel 31 and able to swing about a rear wheel swing shaft 90 that is provided on the body frame 21; a power unit 24 that drives the rear wheel 4; a right shock absorber 62 that supports the right front wheel 32 at a lower portion thereof and that attenuates an upward displacement of the right front wheel 32 in an up-to-down direction of the body frame 21; a left shock absorber 61 that supports the left front wheel 31 at a lower portion thereof and that attenuates an upward displacement of the left front wheel 31 in the up-to-down direction of the body frame 21; and a linkage 5. The linkage 5 includes a right side member 54 that supports an upper portion of the right shock absorber 62 so as to allow the upper portion to turn about a right steering axis Y that extends in the up-to-down direction of the body frame 21; a left side member 53 that supports an upper portion of the left shock absorber 61 so as to allow the upper portion to turn about a left steering axis X that is parallel to the right steering axis Y; an upper cross member 51 that supports an upper portion of the right side member 54 at a right end portion thereof so as to allow the upper portion to turn about a right upper axis that extends in a front-to-rear direction of the body frame 21, and that supports an upper portion of the left side member 53 at a left end portion thereof so as to allow the upper portion to turn about a left upper axis that is parallel to the right upper axis, the middle portion of upper cross member being supported on the body frame 21 so as to turn about a middle upper axis that is parallel to the right upper axis and the left upper axis; and a lower cross member 52 that supports a lower portion of the right side member 54 at a right end portion thereof so as to allow the lower portion to turn about a right lower axis that is parallel to the right upper axis, and that supports a lower portion of the left side member 53 at a left end portion thereof so as to allow the lower portion to turn about a left lower axis that is parallel to the left upper axis, the middle portion of the lower cross member being supported on the body frame 21 so as to turn about a middle lower axis L4 that is parallel to the middle upper axis.

The body frame 21 connects at least the linkage 5 and the rear wheel swing shaft 90 together.

The body frame 21 includes a link support 211 that supports the middle portion of the upper cross member 51 and the middle portion of the lower cross member 52 so as to allow the middle portions to turn above the right front wheel 32 and the left front wheel 31; a lower frame 80 that connects the power unit 24 that is provided in a position where at least a portion of the power unit 24 overlaps a line S1 that connects a point of intersection P of the middle lower axis L4 and the left steering axis X and the rear wheel swing shaft 90 and the link support 211 when the vehicle 1 in the upright state is seen from a side thereof; and an upper frame 70 that is connected to the link support 211 above a connecting portion C1 of the lower frame 80 with the link support 211 in relation to the direction of the left steering axis X and that extends rearwards to at least a connecting portion C2 of the lower frame 80 with the power unit 24 in relation to the direction of the middle lower axis L4. The lower frame 80 includes a lower right frame and a lower left frame 81 that is provided on the left of the lower right frame.

The lower right frame includes a front lower right frame that is positioned ahead of a connecting portion with the power unit 24 when the vehicle 1 in the upright state is seen from the side thereof and a rear lower right frame that is positioned behind a rear end of the front lower right frame and that is welded to the front lower right frame.

The lower left frame 81 includes a front lower left frame 81a that is positioned ahead of the connecting portion C2 with the power unit 24 when the vehicle 1 in the upright state is seen from the side thereof and a rear lower left frame 81b that is positioned behind a rear end of the front lower left frame 81a and that is welded to the front lower left frame 81a.

The upper frame 70 includes an upper right frame and an upper left frame 71 that is positioned on the left of the upper right frame.

The upper right frame includes a front upper right frame that is positioned ahead of a connecting portion with the power unit 24 when the vehicle 1 in the upright state is seen from the side thereof and a rear upper right frame that is positioned behind a rear end of the front upper right frame and that is welded to the front upper right frame.

The upper left frame 71 includes a front upper left frame 71a that is positioned ahead of the connecting portion C2 with the power unit 24 when the vehicle 1 in the upright state is seen from the side thereof and a rear upper left frame 71b that is positioned behind a rear end of the front upper left frame 71a and that is welded to the front upper left frame 71a.

The vehicle according to a preferred embodiment includes the lower frame 80 that connects the power unit 24 that is provided in the position where at least a portion of the power unit 24 overlaps the line S1 that connects the point of intersection P of the middle lower axis L4 and the left steering axis X and the rear wheel swing shaft 90 and the link support 211 when the vehicle 1 in the upright state is seen from a side thereof and the upper frame 70 that is connected to the link support 211 above the connecting portion C1 of the lower frame 80 with the link support 211 in relation to the direction of the left steering axis X and that extends rearwards to at least the connecting portion C2 of the lower frame 80 with the power unit 24 in relation to the direction of the middle lower axis L4.

Namely, according to a preferred embodiment, the upper frame 70 extends from the link support 211 to the rear and the upper frame 70 supports the link support 211 above the lower frame 80. Because of this, the load that is transmitted from the linkage 5 via the link support 211 acts in the longitudinal direction of the upper frame 70, and therefore, the linkage 5 is supported with high rigidity.

Additionally, according to a preferred embodiment, the lower right frame includes the front lower right frame and the rear lower right frame that is preferably welded to the front lower right frame.

The lower left frame 81 includes the front lower left frame 81a and the rear lower left frame 81b that is preferably welded to the front lower left frame 81a.

The upper right frame includes the front upper right frame and the rear upper right frame that is preferably welded to the front upper rear frame.

The upper left frame 71 includes the front upper left frame 71a and the rear upper left frame 71b that is preferably welded to the front upper left frame 71a.

Then, after the rear end surface 211a of the projecting portion has been machined, the rear lower right frame is preferably welded to the front lower left frame, the rear lower left frame 81b is preferably welded to the front lower left frame 81a, the rear upper right frame is preferably welded to the front upper right frame, and the rear upper left frame 71b is preferably welded to the front left frame 71a. By using this structure, in machining the rear end surface 211a of the projecting portion, only the front lower right frame, the front lower left frame 81a, the front upper right frame and the front upper left frame 71a are provided on the link support 211, and therefore, the tool easily reaches the rear end surface 211a of the projecting portion, such that the rear end surface 211a is easily machined.

For these reasons, according to a preferred embodiment of the present invention, the portion is easily machined that supports the linkage 5 with high rigidity and to which the elements of the linkage 5 positioned behind the link support 211 are attached.

VARIOUS MODIFIED EXAMPLES

The preferred embodiments of the present invention described heretofore are intended to facilitate the understanding of the present invention but do not limit the present invention. The preferred embodiments of the present invention can be modified or improved without departing from the spirit and scope thereof and their equivalents also are included within the scope of the present invention.

The terms and expressions that are used in this specification are used to describe the preferred embodiments of the present invention and hence should not be construed as limiting the scope of the present invention. It should be recognized that any equivalents to the characteristic matters that are shown and described in this specification should not be excluded and that various modifications made within the scope of claims to be made below are permitted.

For example, the structure of the body frame 21 is not limited to the above described preferred embodiments.

In the vehicle 1 described above, when the vehicle 1 in the upright state is seen from the side thereof, the connecting portion C2 where the lower frame 80 is connected to the power unit 24 is described as being positioned ahead of the middle point M of the line S1 that connects the point of intersection P of the middle lower axis L4 and the left steering axis X and the rear wheel swing shaft 90. However, the present invention is not limited thereto. The connecting point C2 may be positioned behind the middle point M of the line S1 that connects the point of intersection P of the middle lower axis L4 and the left steering axis X and the rear wheel swing shaft 90. According to this structure, when the vehicle 1 in the upright state is seen from the side thereof, a large space is easily ensured between the right front wheel 32 and the left front wheel 31 and the power unit 24. Because of this, the lower frame 80 is disposed so as to avoid interference with the upper cross member 51, the lower cross member 52, the right front wheel 32 and the left front wheel 31 by the use of the space so defined.

In the vehicle 1 according to a preferred embodiment, the rear frame 77 is described as being integral with the lower frame 80. However, the portion of the body frame 21 that connects the power unit 24 and the rear wheel swing shaft 90 may be separate from the lower frame 80.

In addition, in the vehicle 1 according to a preferred embodiment, the upper frame 70 is described as being integral with the connecting portion of the body frame 21 with the rear wheel swing shaft 90. However, the connecting portion of the rear end portion of the upper frame 70 and the rear wheel swing shaft 90 may be separate.

In the vehicle 1 according to a preferred embodiment, the lower frame 80 and the upper frame 70 are described as having a laterally symmetrical structure. However, the lower frame 80 and the upper frame 70 may be laterally asymmetric.

In the vehicle 1 according to a preferred embodiment, the upper left frame 71 and the lower left frame 81 are described as being integral. However, the upper left frame 71 and the lower left frame 81 may be separate. Alternatively, the upper right frame 72 and the upper left frame 71 are described as being separate. However, the upper right frame 72 and the upper left frame 71 may be integral. Similarly, the lower right frame 82 and the lower left frame 81 may be integral. When referred to herein, "integral" means that pluralities of portions are made integral through casting or the like. Alternatively, "integral" includes a situation in which individual constituent portions are made separately and thereafter, the portions are integrated with one another through welding or the like. "Separate" includes a situation in which individual constituent portions are made separately, and thereafter, the portions are connected together by the use of a fastening device such as a bolt and a nut or a rivet. Alternatively, pipe members are connected together through welding or bolting to fabricate the body frame 21.

In the vehicle according to a preferred embodiment, the front end of the upper frame 70 and the front end of the lower frame 80 are described as being spaced apart in the direction of the left steering axis X. However, the front end of the upper frame 70 may be integral with the front end of the lower frame 80.

Alternatively, a structure may be used in which the upper frame 70 and the lower frame 80 are integral with each other, and when the vehicle 1 in the upright state is seen from the side thereof, the upper frame 70 and the lower frame 80 are made into a plate-shaped member as a whole. Alternatively, when the vehicle 1 in the upright state is seen from the side thereof, a middle frame may be provided so as to be interposed between the upper frame 70 and the lower frame 80.

The upper frame 70 and the lower frame 80 are so named or called only from their relative vertically positional relationship. The upper frame 70 does not mean that it is an uppermost frame but means that it is positioned above the lower frame 80.

In the vehicle 1 according to a preferred embodiment, the lower frame 80 is described as being connected to the upper portion of the power unit 24. However, the present invention is not limited thereto. The lower frame 80 may be connected to the lower portion, the front portion, the rear portion or the like of the power unit 24.

In the vehicle 1 according to a preferred embodiment, when the vehicle 1 in the upright state is seen from the side thereof, the connecting portion C2 is described as being provided in the front upper area when the power unit 24 is divided into four in the up-to-down and front-to-rear directions. However, the present invention is not limited thereto. The connecting portion C2 may be provided in a front lower area, a rear upper area, or a rear lower area of the power unit.

Additionally, in the vehicle 1 according to a preferred embodiment, the connecting portion C2 is described as being provided on the right side surface and the left side surface of the power unit 24. However, the present invention is not limited thereto. The connecting portion C2 may be provided on an upper surface, lower surface, front surface or rear surface of the power unit 24. In addition to the connecting portion C2, a plurality of portions may be provided as the portion where the power unit 24 is supported on the lower frame 80. The upper frame 70 and the lower frame 80 may be connected to the headstock 211 at a plurality of locations.

Further, in the vehicle 1 according to a preferred embodiment of the present invention, at least a portion of the lower frame 80 is described as being provided above the power unit 24. However, at least a portion of the lower frame 80 may be provided below the power unit 24. Alternatively, at least a portion of the lower frame 80 may be provided in a position where it overlaps the power unit 24.

In the vehicle 1 according to a preferred embodiment, the lower frame 80 and the upper frame 70 are described as being integral with each other via the connecting portion 75. However, the present invention is not limited thereto. The lower frame 80 and the upper frame 70 may be separate from each other. In the event that the lower frame 80 and the upper frame 70 are integral with each other, when the vehicle 1 is seen from the side thereof, the connecting portion 75 denotes the portion where a lower edge of the upper frame 70 and the upper edge of the lower frame 80 are combined together at the portion that is separated vertically.

In the vehicle 1 according to a preferred embodiment, the headstock 211 is described as supporting the linkage 5. However, the headstock 211 which supports the steering shaft 652 so as to allow the steering shaft 652 to turn and the member which supports the linkage 5 may be separate members.

In the vehicle 1 according to a preferred embodiment of the present invention, the power unit 24 is described as integrally including the cylinder (the engine 241) including a combustion chamber, the gearbox and the clutch mechanism. However, the present invention is not limited thereto. The cylinder, the gearbox and the clutch mechanism may be provided separately, and these constituent components define the power unit 24 as a whole. The power unit 24 may include an automatic transmission. The power unit 24 may include an electric motor in place of the cylinder. Further, a battery may be fixed to the power unit 24.

In the vehicle 1 according to a preferred embodiment, the power unit 24 is described as being provided in the lower portion of the vehicle 1 when the vehicle 1 in the upright state is seen from the side thereof. However, the present invention is not limited thereto. When the vehicle 1 in the upright state is seen from the side thereof, the power unit 24 may be provided in an upper portion of the vehicle 1, as long as the power unit 24 is provided in the position where at least a portion of the power unit 24 overlaps the line S1 which connects the point of intersection P of the middle lower axis L4 and the left turning axis X and the rear wheel swing shaft 90.

In the vehicle 1 according to a preferred embodiment of the present invention, when the vehicle 1 in the upright state is seen from the side thereof, a portion of the rear portion of the power unit 24 is described as overlapping the line S1. However, the present invention is not limited thereto. A portion of the front portion of the power unit 24 may overlap the line S1.

In the vehicle 1 according to a preferred embodiment of the present invention, when the vehicle 1 in the upright state is seen from the side thereof, a portion of the upper portion of the power unit 24 is described as overlapping the line S1. However, a portion of the lower portion of the power unit 24 may overlap the line S1.

In addition, in the vehicle 1 according to a preferred embodiment of the present invention, even though a large power unit 24 is mounted, the enlargement in size of the vehicle 1 is prevented. Preferred embodiments of the present invention can be applied to a vehicle 1 including a small power unit 24 installed therein. In the event that various preferred embodiments of the present invention are applied to a vehicle 1 including a small power unit 24 of a displacement of about 125 cc or 50 cc, for example, a reduction in size of the vehicle 1 is realized.

In this preferred embodiment, the acute angle is an angle smaller than 90°, including 0°. By nature, the acute angle does not include 0°, but in the present invention and the preferred embodiments described above, the acute angle should include 0°. In the preferred embodiments of the present invention, imaginary planes of the cross members 51, 52 which intersect the middle upper axis L1 and the middle lower axis L4 at right angles are planes that extend rearwards and upwards. However, the present invention is not limited thereto, and hence, the imaginary planes of the cross members 51, 52 which intersect the middle upper axis L1 and the middle lower axis L4 at right angles may be planes that extend forwards and upwards.

When referred to in this specification, "parallel" also includes two straight lines that do not intersect each other as members while they are inclined within the range of ±40°. When referred to in relation to the "direction," and the "member" in the present invention, the term "along" also includes a case where what goes along is inclined within the range of ±40° relative to the direction or the member. When referred to in relation to the "direction" in the description of preferred embodiments of the present invention, "extend" also includes a case where what extends is inclined within the range of ±40° relative to the direction.

The vehicle 1 according to a preferred embodiment of the present invention is a vehicle 1 preferably including the body frame 21 that leans and the two wheels that are aligned side by side in the left-to-right direction. The vehicle 1 may be a vehicle 1 that includes two front wheels 3 and one or more rear wheels 4 or a vehicle 1 that includes two rear wheels 4 and two or more front wheels 3. The vehicle 1 may include the body cover 22 that covers the body frame 21. The vehicle 1 may not include the body cover 22 which covers the body frame 21.

In a preferred embodiment of the present invention, the center of the rear wheel 4 in relation to the left-to-right direction of the body frame 21 coincides with the center of the space defined between the left front wheel 31 and the right front wheel 32 in relation to the left-to-right direction of the body frame 21. Although the structure described above is preferable, the center of the rear wheel 4 in relation to the left-to-right direction of the body frame 21 does not have to coincide with the center of the space defined between the left front wheel 31 and the right front wheel 32 in relation to the left-to-right direction of the body frame 21.

In the preferred embodiments described above, the right side member 54, the left side member 53 and the headstock 211 are provided in the positions that overlap one another when the body frame 21 is seen from a side thereof. However, the headstock 211 may be provided in a position that deflects from the right side member 54 and the left side member 53 in the front-to-rear direction when the body frame 21 seen from the side thereof. Additionally, angles at which the right side member 54 and the left side member 53 are inclined relative to the up-to-down direction of the body frame 21 may differ from an angle at which the headstock 211 is inclined.

The headstock 211 that supports the linkage 5 may include a single component or may include a plurality of components. In the event that the headstock 211 includes the plurality of components, the components may be fastened together through welding or bonding or may be fastened together with a fastening member such as a bolt or a rivet.

In the preferred embodiments described above, the left shock absorber 61 and the right shock absorber 62 each include a pair of telescopic mechanisms. However, the left shock absorber 61 and the right shock absorber 62 may each include one telescopic mechanism according to the specification of the vehicle 1.

In a preferred embodiment, an acute angle defined by the middle steering axis Z of the steering shaft 652 and the up-to-down direction of the body frame 21 coincides with an acute angle defined by the direction in which the right shock absorber 62 and the left shock absorber 61 extend or contract and the up-to-down direction of the body frame 21. However, the present invention is not limited to the preferred embodiments. For example, the acute angle defined by the middle steering axis Z of the steering shaft 652 and the up-to-down direction of the body frame 21 may be smaller or greater than the acute angle defined by the direction in which the right shock absorber 62 and the left shock absorber 61 extend or contract and the up-to-down direction of the body frame 21.

In addition, in a preferred embodiment of the present invention, the middle steering axis Z of the steering shaft 652 and the direction in which the right shock absorber 62 and the left shock absorber 61 extend or contact coincide with each other. However, the present invention is not limited to the preferred embodiments described above. When the vehicle 1 in the upright state is seen from the side thereof, the middle steering axis Z of the steering shaft 652 and the direction in which the right shock absorber 62 and the left shock absorber 61 extend or contact may be offset from each other in the front-to-rear direction. Alternatively, they may intersect each other.

Further, in a preferred embodiment, the direction in which the right shock absorber 62 extends or contracts coincides with the right steering axis Y of the right shock absorber 62, and the direction in which the right shock absorber 62 extends or contracts coincides with the left steering axis X of the left shock absorber 61. However, the present invention is not limited to the preferred embodiments described above. The direction in which the right shock absorber 62 extends or contracts may not coincide with the right steering axis Y of the right shock absorber 62, and the direction in which the right shock absorber 62 extends or contracts may not coincide with the left steering axis X of the left shock absorber 61.

The upper cross member 51 may include an upper front cross portion that includes a single component, an upper rear cross portion that includes a single component and a connecting member that is provided therebetween and that includes a plurality of components. In the event that the headstock 211 includes the plurality of components, the components may be fastened together through welding or bonding or may be fastened together with a fastening member such as a bolt or a rivet.

The lower cross member 52 may include a lower front cross portion that includes a single component, a lower rear cross portion that includes a single component and a connecting member that is provided therebetween and that includes a plurality of components. In the event that the headstock 211 includes a plurality of components, the components may be fastened together through welding or bonding or may be fastened together with a fastening member such as a bolt or a rivet.

The right side member 54 and the left side member 53 may each include a single component or a plurality of components. In the event that the headstock 211 includes the plurality of components, the components may be fastened together through welding or bonding or may be fastened together with a fastening member such as a bolt or a rivet. The right side member 54 and the left side member 53 may each include a portion that is disposed ahead of and a portion that is disposed behind the upper cross member 51 or the lower cross member 52 in the front-to-rear direction of the vehicle body frame 21. The upper cross member 51 or the lower cross member 52 may be disposed between the portions disposed ahead of and the portions disposed behind the right side member 54 and the left side member 53.

In a preferred embodiment of the present invention, the linkage 5 may include further a cross member in addition to the upper cross member 51 and the lower cross member 52. The upper cross member 51 and the lower cross member 52 are so named or called only from their relative vertically positional relationship. The upper cross member 51 does not mean that it is an uppermost cross member in the linkage 5. The upper cross member 51 means that it is positioned above another cross member lying therebelow. The lower cross member 52 does not mean that it is a lowermost cross member in the linkage 5. The lower cross member 52 means that it is positioned below another cross member lying above. In this way, the upper cross member 51 and the lower cross member 52 may each include a plurality of cross members as long as they still exhibit the link function. Further, another cross member may be provided between the upper cross member 51 and the lower cross member 52. The linkage 5 should include the upper cross member 51 and the lower cross member 52.

The present invention can be embodied in many different forms. This disclosure should be understood to provide preferred embodiments of the present invention. Based on the understanding that there is no intention to limit the present invention to the preferred embodiments that are described and/or illustrated herein, the preferred embodiments are described and illustrated herein.

The illustrated preferred embodiments of the present invention are described herein. The present invention is not limited to the preferred embodiments described herein. The present invention also includes every preferred embodiment which includes equivalent elements, modifications, deletions, combinations (for example, a combination of characteristics from various preferred embodiments), improvements and/or alternations which those skilled in the art to which the present invention pertains can recognize based on the disclosure made herein. The limitative matters of claims should be construed broadly based on terms used in the claims and hence should not be limited by the preferred embodiments described in this specification or the prosecution of this patent application. Those preferred embodiments should be construed as non-exclusive. For example, in this disclosure, such terms as "preferable or preferably" and "may be or do" are non-exclusive terms and mean that "it is preferable, but the present invention is not limited thereto" and "it may be or do, but the present invention is not limited thereto," respectively.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
   a body frame that leans to a right of the vehicle when the vehicle turns right and to a left of the vehicle when the vehicle turns left;
   a right front wheel and a left front wheel aligned side by side in a left-to-right direction of the body frame;
   a rear wheel disposed behind the right front wheel and the left front wheel and able to swing about a rear wheel swing shaft on the body frame;
   a power unit that drives the rear wheel;
   a right shock absorber that supports the right front wheel at a lower portion thereof and that attenuates an upward displacement of the right front wheel in an up-to-down direction of the body frame;
   a left shock absorber that supports the left front wheel at a lower portion thereof and that attenuates an upward displacement of the left front wheel in the up-to-down direction of the body frame; and
   a linkage including:
      a right side member that supports an upper portion of the right shock absorber so as to allow the upper portion to turn about a right steering axis that extends in the up-to-down direction of the body frame;
      a left side member that supports an upper portion of the left shock absorber so as to allow the upper portion to turn about a left steering axis that is parallel to the right steering axis;
      an upper cross member that supports an upper portion of the right side member at a right end portion thereof so as to allow the upper portion to turn about a right upper axis that extends in a front-to-rear direction of the body frame, and that supports an upper portion of the left side member at a left end portion thereof so as to allow the upper portion to turn about a left upper axis that is parallel to the right upper axis, the middle portion of the upper cross member being supported on the body frame so as to turn about a middle upper axis that is parallel to the right upper axis and the left upper axis; and a lower cross member that supports a lower portion of the right side member at a right end portion thereof so as to allow the lower portion to turn about a right lower axis that is parallel to the right upper axis, and that supports a lower portion of the left side member at a left end portion thereof so as to allow the lower portion to turn about a left lower axis that is parallel to the left upper axis, the middle portion of the lower cross member being supported on the body frame so as to turn about a middle lower axis that is parallel to the middle upper axis; wherein the body frame connects at least the linkage and the rear wheel swing shaft together;

the body frame includes:

a link support that supports the middle portion of the upper cross member and the middle portion of the lower cross member so as to allow the middle portions to turn above the right front wheel and the left front wheel;

a lower frame that connects the power unit provided in a position where at least a portion of the power unit overlaps a line that connects a point of intersection of the middle lower axis and the left steering axis and the rear wheel swing shaft and the link support when the vehicle in an upright state is seen from a side thereof; and an upper frame that is connected to the link support above a connecting portion of the lower frame with the link support in relation to a direction of the left steering axis and that extends rearwards to at least a connecting portion of the lower frame with the power unit in relation to a direction of the middle lower axis; and when the vehicle in the upright state is seen from the side thereof, a point of intersection of a straight line that passes the connecting portion of the lower frame with the power unit and that intersects the middle lower axis at right angles and an upper edge of the upper frame is positioned above a point of intersection of the middle lower axis and the left steering axis in relation to the direction of the left steering axis.

2. The vehicle according to claim 1, wherein the upper frame and the lower frame are connected together via a connecting portion that is provided between the connecting portion of the lower frame with the link support and the connecting portion of the lower frame with the power unit when the vehicle in the upright state is seen from the side thereof.

3. The vehicle according to claim 1, wherein the lower frame is connected to the link support below the lower cross member in relation to the direction of the left steering axis; and at least a portion of the upper frame is in a position where it overlaps the upper cross member when seen from the front of the middle upper axis.

4. The vehicle according to claim 1, wherein the lower frame includes a lower right frame and a lower left frame which is provided on the left of the lower right frame in relation to the left-to-right direction of the vehicle; and the lower right frame is fixed to a right portion of the power unit, and the lower left frame is fixed to a left portion of the power unit.

5. The vehicle according to claim 1, wherein, when the vehicle in the upright state is seen from the side thereof, the upper edge of the upper frame is positioned above a line which connects a point of intersection of the middle lower axis and the left steering axis and the rear wheel swing shaft in relation to the direction of the left steering axis.

6. The vehicle according to claim 1, wherein the upper frame includes an upper right frame and an upper left frame that is provided on the left of the upper right frame in relation to the left-to-right direction of the vehicle;

the lower frame includes a lower right frame and a lower left frame that is provided on the left of the lower right frame in relation to the left-to-right direction of the vehicle;

the upper right frame and the lower right frame are integral behind a rear end of the linkage in relation to the direction of the middle lower axis; and the upper left frame and the lower left frame are integral behind the rear end of the linkage in relation to the direction of the middle lower axis.

7. The vehicle according to claim 1, wherein the upper frame includes an upper right frame and an upper left frame that is provided on the left of the upper right frame in relation to the left-to-right direction of the vehicle;

the lower frame includes a lower right frame and a lower left frame that is provided on the left of the lower right frame in relation to the left-to-right direction of the vehicle; and when the vehicle is seen from above, portions of the upper right frame, the upper left frame, the lower right frame, and the lower left frame that overlap the lower cross member are positioned at a central portion when the lower cross member is divided into three in the left-to-right direction.

8. The vehicle according to claim 7, wherein the lower frame includes a portion that is positioned below the middle lower axis in relation to the direction of the left steering axis ahead of a rear edge of a movable range of the right front wheel and the left front wheel in relation to the direction of the middle lower axis when the vehicle in the upright state is seen from the side thereof.

9. The vehicle according to claim 1, wherein, when the vehicle in the upright state is seen from the side thereof, the connecting portion of the lower frame with the power unit is positioned ahead of a middle point of the line that connects the point of intersection of the middle lower axis and the left steering axis and the rear wheel swing shaft.

10. The vehicle according to claim 1, wherein the lower frame includes a lower right frame and a lower left frame that is provided on the left of the lower right frame;

the lower right frame includes a front lower right frame that is positioned ahead of a connecting portion with the power unit when the vehicle in an upright state is seen from the side thereof, and a rear lower right frame that is positioned behind a rear end of the front lower right frame and that is connected to the front lower right frame;

the lower left frame includes a front lower left frame that is positioned ahead of a connecting portion with the power unit when the vehicle in the upright state is seen from the side thereof, and a rear lower left frame that is positioned behind a rear end of the front lower left frame and that is connected to the front lower left frame;

the upper frame includes an upper right frame and an upper left frame that is positioned on the left of the upper right frame;

the upper right frame includes a front upper right frame that is positioned ahead of a connecting portion with the power unit when the vehicle in the upright state is seen from the side thereof, and a rear upper right frame that is positioned behind a rear end of the front upper right frame and that is connected to the front upper right frame; and the upper left frame includes a front upper left frame that is positioned ahead of a connecting portion with the power unit when the vehicle in the upright state is seen from the side thereof, and a rear upper left frame that is positioned behind a rear end of the front upper left frame and that is connected to the front upper left frame.

11. A vehicle comprising:

a body frame that leans to a right of the vehicle when the vehicle turns right and to a left of the vehicle when the vehicle turns left;

a right front wheel and a left front wheel aligned side by side in a left-to-right direction of the body frame;

a rear wheel disposed behind the right front wheel and the left front wheel and able to swing about a rear wheel swing shaft on the body frame;

a power unit that drives the rear wheel;

a right shock absorber that supports the right front wheel at a lower portion thereof and that attenuates an upward displacement of the right front wheel in an up-to-down direction of the body frame;

a left shock absorber that supports the left front wheel at a lower portion thereof and that attenuates an upward displacement of the left front wheel in the up-to-down direction of the body frame; and a linkage including:

a right side member that supports an upper portion of the right shock absorber so as to allow the upper portion to turn about a right steering axis that extends in the up-to-down direction of the body frame;

a left side member that supports an upper portion of the left shock absorber so as to allow the upper portion to turn about a left steering axis that is parallel to the right steering axis;

an upper cross member that supports an upper portion of the right side member at a right end portion thereof so as to allow the upper portion to turn about a right upper axis that extends in a front-to-rear direction of the body frame, and that supports an upper portion of the left side member at a left end portion thereof so as to allow the upper portion to turn about a left upper axis that is parallel to the right upper axis, the middle portion of the upper cross member being supported on the body frame so as to turn about a middle upper axis that is parallel to the right upper axis and the left upper axis; and a lower cross member that supports a lower portion of the right side member at a right end portion thereof so as to allow the lower portion to turn about a right lower axis that is parallel to the right upper axis, and that supports a lower portion of the left side member at a left end portion thereof so as to allow the lower portion to turn about a left lower axis that is parallel to the left upper axis, the middle portion of the lower cross member being supported on the body frame so as to turn about a middle lower axis that is parallel to the middle upper axis;

the body frame connects at least the linkage and the rear wheel swing shaft together; wherein the body frame includes:

a link support that supports the middle portion of the upper cross member and the middle portion of the lower cross member so as to allow the middle portions to turn above the right front wheel and the left front wheel;

a lower frame that connects the power unit provided in a position where at least a portion of the power unit overlaps a line that connects a point of intersection of the middle lower axis and the left steering axis and the rear wheel swing shaft and the link support when the vehicle in an upright state is seen from a side thereof; and an upper frame that is connected to the link support above a connecting portion of the lower frame with the link support in relation to a direction of the left steering axis and that extends rearwards to at least a connecting portion of the lower frame with the power unit in relation to a direction of the middle lower axis;

the lower frame includes a lower right frame and a lower left frame that is provided on the left of the lower right frame;

the lower right frame includes a front lower right frame that is positioned ahead of a connecting portion with the power unit when the vehicle in the upright state is seen from the side thereof and a rear lower right frame that is positioned behind a rear end of the front lower right frame and that is connected to the front lower right frame;

the lower left frame includes a front lower left frame that is positioned ahead of the connecting portion with the power unit when the vehicle in the upright state is seen from the side thereof and a rear lower left frame that is positioned behind a rear end of the front lower left frame and that is connected to the front lower left frame;

the upper frame includes an upper right frame and an upper left frame that is positioned on the left of the upper right frame;

the upper right frame includes a front upper right frame that is positioned ahead of a connecting portion with the power unit when the vehicle in the upright state is seen from the side thereof and a rear upper right frame that is positioned behind a rear end of the front upper right frame and that is connected to the rear upper right frame;

the upper left frame includes a front upper left frame that is positioned ahead of the connecting portion with the power unit when the vehicle in the upright state is seen from the side thereof and a rear upper left frame that is positioned behind a rear end of the front upper left frame and that is connected to the front upper left frame.

* * * * *